(12) United States Patent
Baker et al.

(10) Patent No.: US 10,626,508 B2
(45) Date of Patent: Apr. 21, 2020

(54) CATALYTIC MATERIALS AND METHODS OF MAKING AND USING THEREOF

(71) Applicant: Ohio State Innovation Foundation, Columbus, OH (US)

(72) Inventors: Lawrence Robert Baker, Upper Arlington, OH (US); Xin Yang, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 108 days.

(21) Appl. No.: 15/602,696

(22) Filed: May 23, 2017

(65) Prior Publication Data

US 2017/0335472 A1 Nov. 23, 2017

Related U.S. Application Data

(60) Provisional application No. 62/340,061, filed on May 23, 2016.

(51) Int. Cl.
| | |
|---|---|
| *B01J 23/72* | (2006.01) |
| *B01J 23/745* | (2006.01) |
| *B01J 23/755* | (2006.01) |
| *C25B 3/04* | (2006.01) |
| *C25B 1/00* | (2006.01) |
| *C25B 11/04* | (2006.01) |
| *B01J 19/12* | (2006.01) |
| *B01J 35/00* | (2006.01) |

(52) U.S. Cl.
CPC ............ *C25B 3/04* (2013.01); *B01J 19/127* (2013.01); *B01J 23/745* (2013.01); *B01J 35/002* (2013.01); *B01J 35/004* (2013.01); *B01J 35/0013* (2013.01); *C25B 1/003* (2013.01); *C25B 11/0405* (2013.01); *C25B 11/0478* (2013.01)

(58) Field of Classification Search
CPC ........ B01J 23/72; B01J 23/745; B01J 23/755; B01J 35/0013; B01J 35/002; B01J 35/004; C25B 3/04; C25B 1/002; C25B 11/0405; C25B 11/0478
See application file for complete search history.

(56) References Cited

U.S. PATENT DOCUMENTS

| | | | |
|---|---|---|---|
| 4,729,889 A * | 3/1988 | Flytani-Stephanopoulos | ............... B01J 20/06 423/593.1 |
| 4,748,144 A * | 5/1988 | Monnier | ................ B01J 23/002 502/316 |
| 10,280,525 B2 * | 5/2019 | Dennis | ................ H01M 14/005 |
| 2009/0321244 A1 * | 12/2009 | Smith | .................... B01J 19/127 204/157.52 |

(Continued)

OTHER PUBLICATIONS

Banwart, et al., "The role of oxalate in accelerating the reductive dissolution of hematite (a-Fe2O3) by ascorbate", Colloids Surf. 1989, 39, 303-309.

(Continued)

*Primary Examiner* — Cam N. Nguyen
(74) *Attorney, Agent, or Firm* — Meunier Carlin & Curfman LLC

(57) ABSTRACT

Iron-containing mixed-phase metal oxides are described. The mixed-phase metal oxides can exhibit electrocatalytic and/or photo-electrocatalytic activity towards reducing reactions, such as the reduction of carbon dioxide.

19 Claims, 15 Drawing Sheets

(56) References Cited

U.S. PATENT DOCUMENTS

2016/0319097 A1\* 11/2016 Comstock ............ C01G 49/009
2019/0211461 A1\* 7/2019 Dennis ................ H01M 14/005

OTHER PUBLICATIONS

Cole, et al., "Using a one-electron shuttle for the multielectron reduction of CO2 to methanol: kinetic, mechanistic, and structural insights" J. Am. Chem. Soc. 2010, 132, 11539-11551.
Chen, et al., "Aqueous CO2 Reduction at Very Low Overpotential on Oxide-Derived Au Nanoparticles", J. Am. Chem. Soc. 2012, 134, 19969-19972.
Díez-García, et al., "Study of Copper Ferrite as a Novel Photocathode for Water Reduction: Improving Its Photoactivity by Electrochemical Pretreatment", ChemSusChem 2016, 1504-1512.
Dresselhaus, et al., "Alternative energy technologies", Nature 2001, 414, 332-337.
Friebel et al., "Structure, Redox Chemistry, and Interfacial Alloy Formation in Monolayer and Multilayer Cu/Au(111) Model Catalysts for CO2 Electroreduction", J. Phys. Chem. C 2014, 118, 7954-7961.
Gu et al., "Mg-Doped CuFeO2 Photocathodes for Photoelectrochemical Reduction of Carbon Dioxide", J. Phys. Chem. C 2013, 117, 12415-12422.
Hori, et al. "Electrolytic Reduction of Bicarbonate Ion at a Mercury Electrode", J. Electrochem. Soc. 1983, 130, 2387-2390.
Jiang, et al., "Turning carbon dioxide into fuel", Phil. Trans. R. Soc. A 2010, 368, 3343-3364.
Kang, et al., "Photosynthesis of Formate from CO2 and Water at 1% Energy Efficiency via Copper Iron Oxide Catalysis", Energy & Environmental Science 2015, 8, 2638-2643.
Katz, et al., "Observation of Transient Iron(II) Formation in Dye-Sensitized Iron Oxide Nanoparticles by Time-Resolved X-ray Spectroscopy", J. phys. Chem. Lett 2010, 1, 1372-1376.
Kortlever, et al., "Catalysts and Reaction Pathways for the Electrochemical Reduction of Carbon Dioxide", J. Phys. Chem. Lett. 2015, 6, 4073-4082.
Kumar, et al., Photochemical and Photoelectrochemical Reduction of CO2 Annu. Rev. Phys. Chem. 2012, 63, 541-569.
Lee, et al., "Controlling H+ vs CO2 Reduction Selectivity on Pb Electrodes", ACS Catalysis 2014, 5, 465-469.
Lewis, et al., "Powering the planet: Chemical challenges in solar energy utilization", Proc. Natl. Acad. Sci. U.S.A. 2006, 103, 15729-15735.
Li, C. J. "Organic reactions in aqueous media—with a focus on carbon-carbon bond formation", Chem. Rev. 1993, 93, 2023-2035.
Li, et al., "CO2 reduction at low overpotential on Cu electrodes resulting from the reduction of thick Cu2O films", J. Am. Chem. Soc. 2012, 134, 7231-7234.
Li, et al., "Reduction of CO2 to low carbon alcohols on CuO FCs/Fe2O3 NTs catalyst with photoelectric dual catalytic interfaces", Nanoscale 2013, 5, 11748-11754.
Morales, et al., "Use of low-temperature nanostructured CuO thin films deposited by spray-pyrolysis in lithium cells", Thin Solid Films 2005, 474, 133-140.
Negishi, E. "Palladium- or nickel-catalyzed cross coupling. A new selective method for carbon-carbon bond formation", Acc. Chem. Res. 1982, 15, 340-348.
Nie, et al., "Selectivity of CO(2) reduction on copper electrodes: the role of the kinetics of elementary steps", Angew. Chem. Int. Ed. 2013, 52, 2459-2462.
Read, et al., "Electrochemical Synthesis of p-Type CuFeO2 Electrodes for Use in a Photoelectrochemical Cell", J. Phys. Chem. Lett. 2012, 3, 1872-1876.
Reske, et al., "Controlling Catalytic Selectivities during CO2 Electroreduction on Thin Cu Metal Overlayers", The Journal of Physical Chemistry Letters 2013, 4, 2410-2413.
Sampson, et al., "Manganese Electrocatalysts with Bulky Bipyridine Ligands: Utilizing Lewis Acids to Promote Carbon Dioxide Reduction at Low Overpotentials", J. Am. Chem. Soc. 2016, 138, 1386-1393.
Schouten, et al., "A new mechanism for the selectivity to C1 and C2 species in the electrochemical reduction of carbon dioxide on copper electrodes", Chemical Science 2011, 2, 1902-1909.
Seshadri, et al., "A new homogeneous electrocatalyst for the reduction of carbon dioxide to methanol at low overpotential", J. Electroanal. Chem. 1994, 372, 145-150.
Sivula, et al., "Semiconducting materials for photoelectrochemical energy conversion", Nat. Rev. Mater. 2016, 1, 15010.
Smieja, et al., "Manganese as a Substitute for Rhenium in CO2 Reduction Catalysts: The Importance of Acids", Inorg. Chem. 2013, 52, 2484-2491.
Spray, R. L.; Choi, K.-S. "Photoactivity of Transparent Nanocrystalline Fe2O3 Electrodes Prepared via Anodic Electrodeposition", Chem. Mater. 2009, 21, 3701-3709.
Stumm, et al., "The cycling of iron in natural environments: Considerations based on laboratory studies of heterogeneous redox processes", Geochim. Cosmochim. Acta. 1992, 56, 3233-3257.
Su, et al., "Exploration of Earth-Abundant Transition Metals (Fe, Co, and Ni) as Catalysts in Unreactive Chemical Bond Activations", Acc. Chem. Res. 2015, 48, 886-896.
Vasquez, R. P. "Cu2O by XPS", Surf. Sci. Spectra 1998, 5, 257-261.
Wadia, et al., "Materials Availability Expands the Opportunity for Large-Scale Photovoltaics Deployment", Energy Environ. Sci. 2009, 43, 2072-2077.
Wang, et al., "Enhanced Photoreduction CO2 Activity Over Direct Z-Scheme α-Fe2O3/Cu2O Heterostructures under Visible Light Irradiation", ACS Appl. Mater. Interfaces 2015, 7, 8631-8639.
White, et al., "Light-Driven Heterogeneous Reduction of Carbon Dioxide: Photocatalysts and Photoelectrodes", Chem. Rev. 2015, 115, 12888-12935.

\* cited by examiner

CATALYTIC MATERIALS AND METHODS OF MAKING AND USING THEREOF

CROSS-REFERENCE TO RELATED APPLICATIONS

This application claims benefit of U.S. Provisional Application No. 62/340,061, filed May 23, 2016, which is hereby incorporated herein by reference in its entirety.

STATEMENT REGARDING FEDERALLY SPONSORED RESEARCH OR DEVELOPMENT

This invention was made with Government Support under Award No. FA9550-15-1-0204 awarded by the Air Force Office of Scientific Research. The Government has certain rights in the invention.

BACKGROUND

The combustion of fossil fuels in activities such as the electricity generation, transportation, and manufacturing produces billions of tons of carbon dioxide annually. Research since the 1970s indicates increasing concentrations of carbon dioxide in the atmosphere may be responsible for altering the Earth's climate, changing the pH of the ocean and other potentially damaging effects. Countries around the world, including the United States, are seeking ways to mitigate emissions of carbon dioxide.

Converting carbon dioxide into economically valuable materials (e.g., fuels and/or industrial chemicals) offers an attractive strategy for mitigating carbon dioxide emissions. For many years, researchers have attempted to use electrochemistry and/or photochemistry to convert carbon dioxide to economically valuable products. However, existing methods for the conversion of carbon dioxide suffer from many limitations, including the stability of systems used in the process, the efficiency of systems, the selectivity of the systems or processes for a desired chemical, the cost of materials used in systems/processes, the ability to control the processes effectively, and the rate at which carbon dioxide is converted. No commercially available solutions for converting carbon dioxide to economically valuable fuels or industrial chemicals currently exist.

SUMMARY

Provided herein are mixed-phase metal oxide catalysts. The catalysts can exhibit electrocatalytic and/or photoelectrocatalytic activity. For example, the catalysts described herein can be used to catalyze reducing reactions, such as the reduction of carbon dioxide.

For example, provided herein are mixed-phase electrocatalysts that comprise a first metal oxide phase and a second metal oxide phase. The first metal oxide phase can comprise a metal oxide defined by Formula I or Formula II below

    Formula I

    Formula II where M is chosen from Cu and Ni. The second metal oxide phase can comprise a metal oxide defined by Formula III or Formula IV below

    Formula III

    Formula IV where M is chosen from Cu and Ni.

In some embodiments, the first metal oxide phase can comprise $Fe_2O_3$ and the second metal oxide phase can comprise $NiFe_2O_4$. In other embodiments, the first metal oxide phase can comprise CuO and the second metal oxide phase can comprise $CuFeO_2$.

The mixed-phase electrocatalysts can have a surface Fe:M atomic ratio (e.g., a surface Fe:Cu atomic ratio, or a surface Fe:Ni ratio) of greater than or equal to 0.75:1, as measured by x-ray photoelectron spectroscopy (XPS). For example, in some embodiments, the surface Fe:M atomic ratio (e.g., surface Fe:Cu atomic ratio, or surface Fe:Ni ratio) can be from 0.75:1 to 7:1 (e.g., from 0.75:1 to 5:1, from 0.75:1 to 2:1, or from 1:1 to 1.5:1).

The surface of the mixed-phase electrocatalysts can exhibit an iron content that is the same or greater than the bulk of the mixed-phase electrocatalysts. For example, the surface Fe:M atomic ratio, as measured by XPS, greater than or equal to the bulk Fe:M atomic ratio, as measured by inductively coupled plasma mass spectrometry (ICP-MS). In some embodiments, the bulk Fe:M atomic ratio (e.g., bulk Fe:Cu atomic ratio, or bulk Fe:Ni ratio) can be from 0.4:1 to 10:1 (e.g., from 0.4:1 to 7:1; from 0.4:1 to 5:1, from 0.4:1 to 2:1, or from 0.8 to 1.5).

Also provided herein are electrodes comprising a conductive substrate and an electrocatalytic thin film disposed on the conductive substrate. The electrocatalytic thin film can be formed from aggregated nanoparticles comprising a mixed-phase electrocatalyst described above. In some embodiments, the nanoparticles can have an average particle size of from 10 nm to 500 nm (e.g., 50 nm to 300 nm), as determined by scanning electron microscopy (SEM). In some cases, the electrocatalytic thin film can be nanoporous. In certain embodiments, the thin film can have a thickness, as determined by SEM, of from 10 nm to 500 nm (e.g., 50 nm to 300 nm).

Also provided are methods for electrochemically reducing carbon dioxide using the mixed-phase electrocatalysts described herein. Methods for electrochemically reducing carbon dioxide can comprise contacting the carbon dioxide with a mixed-phase electrocatalyst described herein in an electrochemical cell, and applying a potential to the electrochemical cell to form a product. The applied potential is from −0.1 V to −1.8 V (e.g., from −0.2 V to −1.8 V) vs. an Ag/AgCl reference electrode.

In some embodiments, the product can comprise acetate, formate, or a combination thereof. In certain embodiments, the acetate, the formate, or the combination thereof can be formed at a Faradaic efficiency of from 15% to 95% (e.g., from 15% to 50%, from 30% to 70%, or from 60% to 95%). In certain embodiments, the method can be selective for the formation of acetate over formate, such that the acetate is formed with at least two times greater (e.g., at least three times greater, at least four times greater, at least five times greater, or at least ten times greater) Faradaic efficiency than the formate.

In some embodiments, the method can further comprise contacting the mixed-phase electrocatalyst with an electron scavenger. In some cases, contacting the mixed-phase electrocatalyst with the electron scavenger can comprise introducing the electron scavenger into an electrolyte solution present in the electrochemical cell. By way of example, the electron scavenger can comprise, for example, $O_2$, and contacting the mixed-phase electrocatalyst with the electron scavenger can comprise bubbling the $O_2$ into an electrolyte solution present in the electrochemical cell. The electron scavenger can serve to stabilize the mixed-phase electrocatalyst during the reduction reaction.

In some cases, the method can further comprise impinging the electrocatalyst with electromagnetic radiation (e.g., visible light). In other embodiments, the methods described herein can be performed in the absence of illumination.

DESCRIPTION OF DRAWINGS

FIG. 6A shows ion chromatograms of the post-electrolysis solution with addition of known concentrations of standard sodium acetate. FIG. 6B is a linear regression plot of integrated peak area as a function of standard acetate added. The extrapolation to the x-intercept represents the acetate concentration produced during the photo-electrochemical reaction.

DETAILED DESCRIPTION

Figure 1:
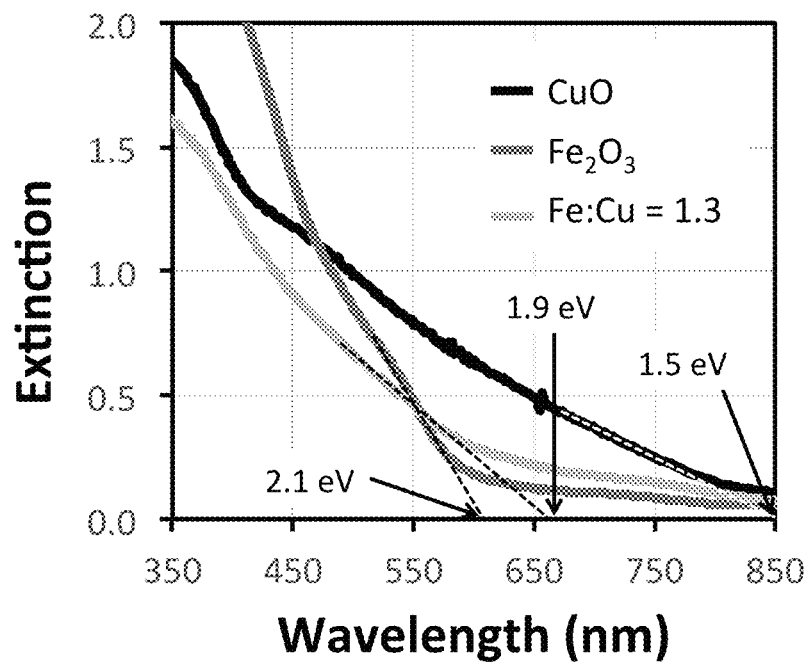
FIG. 1 is a plot of the UV/Vis extinction spectra of CuO, $Fe_2O_3$, and Fe—Cu oxide (Fe:Cu=1.3) catalysts on FTO substrates.

Provided herein are mixed-phase metal oxide catalysts. The catalysts can exhibit electrocatalytic and/or photoelectrocatalytic activity. For example, the catalysts can be used to catalyze reduction reactions, such as the reduction of carbon dioxide.

For example, provided herein are mixed-phase electrocatalysts that comprise a first metal oxide phase and a second metal oxide phase. The first metal oxide phase can comprise a metal oxide defined by Formula I or Formula II below MO     Formula I $Fe_2O_3$     Formula II where M is chosen from Cu and Ni. The second metal oxide phase can comprise a metal oxide defined by Formula III or Formula IV below $MFeO_2$     Formula III $(M,Fe)_3O_4$     Formula IV where M is chosen from Cu and Ni.

In some embodiments, the first metal oxide phase can comprise $Fe_2O_3$ and the second metal oxide phase can comprise $NiFe_2O_4$. In other embodiments, the first metal oxide phase can comprise CuO and the second metal oxide phase can comprise $CuFeO_2$.

The Fe:M atomic ratio in the mixed-phase electrocatalysts can be varied, for example, to influence catalyst selectivity. The mixed-phase electrocatalysts can have a surface Fe:M atomic ratio (e.g., a surface Fe:Cu atomic ratio, or a surface Fe:Ni ratio) of at least (i.e., greater than or equal to) 0.75:1 (e.g., at least 0.8:1, at least 0.85:1, at least 0.9:1, at least 0.95:1, at least 1:1, at least 1.1:1, at least 1.2:1, at least 1.3:1, at least 1.4:1, at least 1.5:1, at least 1.6:1, at least 1.7:1, at least 1.8:1, at least 1.9:1, at least 2:1, at least 2.5, at least 3:1, at least 3.5:1, at least 4:1, at least 4.5:1, at least 5:1, at least 5.5:1, at least 6:1, or at least 6.5:1), as measured by x-ray photoelectron spectroscopy (XPS). The mixed-phase electrocatalysts can have a surface Fe:M atomic ratio (e.g., a surface Fe:Cu atomic ratio, or a surface Fe:Ni ratio) of 7:1 or less (e.g., 6.5:1 or less, 6:1 or less, 5.5:1 or less, 5:1 or less, 4.5:1 or less, 4:1 or less, 3.5:1 or less, 3:1 or less, 2.5:1 or less, 2:1 or less, 1.9:1 or less, 1.8:1 or less, 1.7:1 or less, 1.6:1 or less, 1.5:1 or less, 1.4:1 or less, 1.3:1 or less, 1.2:1 or less, 1.1:1 or less, 1:1 or less, 0.95:1 or less, 0.9:1 or less, 0.85:1 or less, or 0.8:1 or less), as measured by XPS.

The mixed-phase electrocatalysts can have a surface Fe:M atomic ratio (e.g., a surface Fe:Cu atomic ratio, or a surface Fe:Ni ratio) ranging from any of the minimum values described above to any of the maximum values described above. For example, the surface Fe:M atomic ratio (e.g., surface Fe:Cu atomic ratio, or surface Fe:Ni ratio) of the mixed-phase electrocatalysts can be from 0.75:1 to 7:1 (e.g., from 0.75:1 to 5:1, from 0.75:1 to 2:1, or from 1:1 to 1.5:1).

The mixed-phase electrocatalysts can have a bulk Fe:M atomic ratio (e.g., a bulk Fe:Cu atomic ratio, or a bulk Fe:Ni ratio) of at least (i.e., greater than or equal to) 0.4:1 (e.g., at least 0.45:1, at least 0.5:1, at least 0.55:1, at least 0.6:1, at least 0.65:1, at least 0.7:1, at least 0.75:1, at least 0.8:1, at least 0.85:1, at least 0.9:1, at least 0.95:1, at least 1:1, at least 1.1:1, at least 1.2:1, at least 1.3:1, at least 1.4:1, at least 1.5:1, at least 1.6:1, at least 1.7:1, at least 1.8:1, at least 1.9:1, at least 2:1, at least 2.5, at least 3:1, at least 3.5:1, at least 4:1, at least 4.5:1, at least 5:1, at least 5.5:1, at least 6:1, at least 6.5:1, at least 7:1, at least 7.5:1, at least 8:1, at least 8.5:1, at least 9:1, or at least 9.5:1), as measured by inductively coupled plasma mass spectrometry (ICP-MS). The mixed-phase electrocatalysts can have a bulk Fe:M atomic ratio (e.g., a bulk Fe:Cu atomic ratio, or a bulk Fe:Ni ratio) of 10:1 or less (e.g., 9.5:1 or less, 9:1 or less, 8.5:1 or less, 8:1 or less, 7.5:1 or less, 7:1 or less, 6.5:1 or less, 6:1 or less, 5.5:1 or less, 5:1 or less, 4.5:1 or less, 4:1 or less, 3.5:1 or less, 3:1 or less, 2.5:1 or less, 2:1 or less, 1.9:1 or less, 1.8:1 or less, 1.7:1 or less, 1.6:1 or less, 1.5:1 or less, 1.4:1 or less, 1.3:1 or less, 1.2:1 or less, 1.1:1 or less, 1:1 or less, 0.95:1 or less, 0.9:1 or less, 0.85:1 or less, 0.8:1 or less, 0.75:1 or less, 0.7:1 or less, 0.65:1 or less, 0.6:1 or less, 0.55:1 or less, 0.5:1 or less, or 0.45 or less), as measured by ICP-MS.

The mixed-phase electrocatalysts can have a bulk Fe:M atomic ratio (e.g., a bulk Fe:Cu atomic ratio, or a bulk Fe:Ni ratio) ranging from any of the minimum values described above to any of the maximum values described above. For example, the bulk Fe:M atomic ratio (e.g., bulk Fe:Cu atomic ratio, or bulk Fe:Ni ratio) of the mixed-phase electrocatalysts can be from 0.4:1 to 10:1 (e.g., from 0.4:1 to 7:1; from 0.4:1 to 5:1, from 0.4:1 to 2:1, or from 0.8 to 1.5).

In some cases, the surface of the mixed-phase electrocatalysts can exhibit an iron content that is the same or different than the iron content of the bulk of the mixed-phase electrocatalysts. In some cases, the surface of the mixed-phase electrocatalysts can exhibit an iron content that is the same or greater than the iron content of the bulk of the mixed-phase electrocatalysts. In certain embodiments, the surface of the mixed-phase electrocatalyst can be iron-enriched (i.e., the surface of the mixed-phase electrocatalyst can exhibit an iron content that is greater than the iron content of the bulk of the mixed-phase electrocatalyst).

In some embodiments, the ratio of the surface Fe:M atomic ratio (e.g., the surface Fe:Cu atomic ratio, or the surface Fe:Ni ratio), as measured by XPS, to the bulk Fe:M atomic ratio (e.g., the bulk Fe:Cu atomic ratio, or the bulk Fe:Ni ratio), as measured by ICP-MS, can be greater than 1:1 (e.g., at least 1.1:1, at least 1.2:1, at least 1.3:1, at least 1.4:1, at least 1.5:1, at least 1.6:1, at least 1.7:1, at least 1.8:1, at least 1.9:1, at least 2:1, at least 2.5:1, at least 3:1, or at least 3.5:1). In some embodiments, the ratio of the surface Fe:M atomic ratio (e.g., the surface Fe:Cu atomic ratio, or the surface Fe:Ni ratio), as measured by XPS, to the bulk Fe:M atomic ratio (e.g., the bulk Fe:Cu atomic ratio, or the bulk Fe:Ni ratio), as measured by ICP-MS, can be 4:1 or less (e.g., 3.5:1 or less, 3:1 or less, 2.5:1 or less, 2:1 or less, 1.9:1 or less, 1.8:1 or less, 1.7:1 or less, 1.6:1 or less, 1.5:1 or less, 1.4:1 or less, 1.3:1 or less, 1.2:1 or less, or 1.1:1 or less).

The ratio of the surface Fe:M atomic ratio (e.g., the surface Fe:Cu atomic ratio, or the surface Fe:Ni ratio), as measured by XPS, to the bulk Fe:M atomic ratio (e.g., the bulk Fe:Cu atomic ratio, or the bulk Fe:Ni ratio), as measured by ICP-MS, can range from any of the minimum values described above to any of the maximum values described above. For example, the ratio of the surface Fe:M atomic ratio (e.g., the surface Fe:Cu atomic ratio, or the surface Fe:Ni ratio), as measured by XPS, to the bulk Fe:M atomic ratio (e.g., the bulk Fe:Cu atomic ratio, or the bulk Fe:Ni ratio), as measured by ICP-MS, can range from greater than 1:1 to 4:1 (e.g., from greater than 1:1 to 2:1).

The mixed-phase electrocatalysts can be formed into nanoparticles prior to use in conjunction with the methods described herein using any suitable method known in the art.

The nanoparticles formed by the process can be spherical or non-spherical in shape. In certain embodiments, the nanoparticles can be discrete, spherical nanoparticles. In some embodiments, the population of nanoparticles formed by this process is monodisperse. The nanoparticles can optionally comprise nanopores. In some embodiments, the nanopores can interconnect, so as to form a network of nanopores spanning the nanoparticles. In some embodiments, the nanoparticles can be aggregated to form an electrocatalytic thin film. In certain embodiments, the electrocatalytic thin film can be porous (e.g., microporous, mesoporous, or nanoporous). For example, the electrocatalytic thin film can comprise pores that are interconnected, so as to form a network of pores spanning the thin film. Porous thin films can be fabricated by etching pores into a solid material as well as by the aggregation of individual particles.

"Monodisperse" and "homogeneous size distribution," as used herein, and generally describe a population of particles where all of the particles are the same or nearly the same size. As used herein, a monodisperse distribution refers to particle distributions in which 80% of the distribution (e.g., 85% of the distribution, 90% of the distribution, or 95% of the distribution) lies within 25% of the median particle size (e.g., within 20% of the median particle size, within 15% of the median particle size, within 10% of the median particle size, or within 5% of the median particle size).

"Mean particle size" or "average particle size", are used interchangeably herein, and generally refer to the statistical mean particle size of the particles in a population of nanoparticles. The diameter of an essentially spherical particle can refer to the physical diameter of the spherical particle. The diameter of a non-spherical nanoparticle can refer to the largest linear distance between two points on the surface of the nanoparticle. Mean particle size can be measured using methods known in the art, such as evaluation by scanning electron microscopy.

In some embodiments, the mixed-phase electrocatalysts can comprise nanoparticles having an average particle size, as measured by scanning electron microscopy (SEM), of at least 10 nm (e.g., at least 15 nm, at least 20 nm, at least 25 nm, at least 30 nm, at least 35 nm, at least 40 nm, at least 45 nm, at least 50 nm, at least 55 nm, at least 60 nm, at least 65 nm, at least 70 nm, at least 75 nm, at least 80 nm, at least 85 nm, at least 90 nm, at least 95 nm, at least 100 nm, at least 150 nm, at least 200 nm, at least 250 nm, at least 300 nm, at least 350 nm, at least 400 nm, at least 450 nm, at least 500 nm, at least 550 nm, at least 600 nm, at least 650 nm, at least 700 nm, at least 750 nm, at least 800 nm, at least 850 nm, at least 900 nm, or at least 950 nm). In some embodiments, the mixed-phase electrocatalysts can comprise nanoparticles having an average particle size, as measured by SEM, of 1000 nm or less (e.g., 950 nm or less, 900 nm or less, 850 nm or less, 800 nm or less, 750 nm or less, 700 nm or less, 650 nm or less, 600 nm or less, 550 nm or less, 500 nm or less, 450 nm or less, 400 nm or less, 350 nm or less, 300 nm or less, 250 nm or less, 200 nm or less, 150 nm or less, 100 nm or less, 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, or 15 nm or less).

The mixed-phase electrocatalysts can comprise nanoparticles having an average particle size, as measured by SEM, ranging from any of the minimum values described above to any of the maximum values described above. For example, the mixed-phase electrocatalysts can comprise nanoparticles having an average particle size, as measured by SEM, of from 10 nm to 1000 nm (e.g., from 10 nm to 500 nm, from 10 nm to 250 nm, from 10 nm to 150 nm, from 20 nm to 100 nm, from 20 nm to 80 nm, or from 80 nm to 100 nm, from 10 nm to 80 nm, from 25 nm to 80 nm, or from 50 nm to 80 nm).

If desired for a particular application, the mixed-phase electrocatalysts described herein can be deposited on an electrode. Accordingly, also provided are electrodes comprising a conductive substrate and an electrocatalytic thin film disposed on the conductive substrate. The electrocatalytic thin film can be formed from aggregated nanoparticles comprising a mixed-phase electrocatalyst described above.

The conductive substrate can be any suitable electrically conductive material. For example, the conductive substrate can be a surface of an electrode (e.g., a metal electrode, such as a copper electrode, a platinum electrode, or a gold electrode; or a carbon electrode). In certain embodiments, such as when the catalyst is to be used in a photo-electrocatalytic application, the conductive surface can be an optically transparent conductive surface (e.g., e.g., a fluorine-doped tin oxide (FTO) coated glass substrate).

In some embodiments, the nanoparticles forming the thin film can have an average particle size, as measured by scanning electron microscopy (SEM), of at least 10 nm (e.g., at least 15 nm, at least 20 nm, at least 25 nm, at least 30 nm, at least 35 nm, at least 40 nm, at least 45 nm, at least 50 nm, at least 55 nm, at least 60 nm, at least 65 nm, at least 70 nm, at least 75 nm, at least 80 nm, at least 85 nm, at least 90 nm, at least 95 nm, at least 100 nm, at least 150 nm, at least 200 nm, at least 250 nm, at least 300 nm, at least 350 nm, at least 400 nm, at least 450 nm, at least 500 nm, at least 550 nm, at least 600 nm, at least 650 nm, at least 700 nm, at least 750 nm, at least 800 nm, at least 850 nm, at least 900 nm, or at least 950 nm). In some embodiments, the nanoparticles forming the thin film can have an average particle size, as measured by SEM, of 1000 nm or less (e.g., 950 nm or less, 900 nm or less, 850 nm or less, 800 nm or less, 750 nm or less, 700 nm or less, 650 nm or less, 600 nm or less, 550 nm or less, 500 nm or less, 450 nm or less, 400 nm or less, 350 nm or less, 300 nm or less, 250 nm or less, 200 nm or less, 150 nm or less, 100 nm or less, 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, or 15 nm or less).

The nanoparticles forming the thin film can have an average particle size, as measured by SEM, ranging from any of the minimum values described above to any of the maximum values described above. For example, the nanoparticles forming the thin film can have an average particle size, as measured by SEM, of from 10 nm to 1000 nm (e.g., from 10 nm to 500 nm, from 10 nm to 250 nm, from 10 nm to 150 nm, from 20 nm to 100 nm, from 20 nm to 80 nm, or from 80 nm to 100 nm, from 10 nm to 80 nm, from 25 nm to 80 nm, or from 50 nm to 80 nm).

In some embodiments, the thin film can have a thickness, as determined by SEM, of at least 10 nm (e.g., at least 15 nm, at least 20 nm, at least 25 nm, at least 30 nm, at least 35 nm, at least 40 nm, at least 45 nm, at least 50 nm, at least 55 nm, at least 60 nm, at least 65 nm, at least 70 nm, at least 75 nm, at least 80 nm, at least 85 nm, at least 90 nm, at least 95 nm, at least 100 nm, at least 150 nm, at least 200 nm, at least 250 nm, at least 300 nm, at least 350 nm, at least 400 nm, or at least 450 nm). In some embodiments, the thin film can have a thickness, as determined by SEM, of 10 microns or less (e.g., 9 microns or less, 8 microns or less, 7 microns or less, 6 microns or less, 5 microns or less, 4 microns or less, 3 microns or less, 2.5 microns or less, 2 microns or less, 1.5 microns or less, 1000 nm or less, 950 nm or less, 900 nm or less, 850 nm or less, 800 nm or less, 750 nm or less, 700 nm or less, 650 nm or less, 600 nm or less, 550 nm or less, 500 nm or less, 450 nm or less, 400 nm or less, 350 nm or less, 300 nm or less, 250 nm or less, 200 nm or less, 150 nm or less, 100 nm or less, 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, or 15 nm or less).

The thin film can have a thickness, as determined by SEM, ranging from any of the minimum values described above to any of the maximum values described above. For example, the thin film can have a thickness, as determined by SEM, of from 10 nm to 10 microns (e.g., from 1000 nm to 10 microns, from 1000 nm to 5 microns, from 10 nm to 1000 nm, 10 nm to 500 nm, from 10 nm to 250 nm, from 10 nm to 150 nm, from 20 nm to 100 nm, from 20 nm to 80 nm, or from 80 nm to 100 nm, from 10 nm to 80 nm, from 25 nm to 80 nm, or from 50 nm to 80 nm).

As discussed above, the mixed-phase metal oxides described herein can exhibit electrocatalytic and/or photoelectrocatalytic activity. Accordingly, also provided herein are methods of using the mixed-phase metal oxides described herein as catalysts in reactions.

For example, the mixed-phase metal oxides can be used to catalyze reduction reactions, such as the reduction of carbon dioxide. Accordingly, provided herein are methods for electrochemically reducing carbon dioxide using the mixed-phase electrocatalysts described herein. Methods for electrochemically reducing carbon dioxide can comprise contacting the carbon dioxide with a mixed-phase electrocatalyst described herein in an electrochemical cell, and applying a potential to the electrochemical cell to form a product.

Contacting the carbon dioxide with a mixed-phase electrocatalyst can comprise introducing the carbon dioxide into an electrolyte solution present in the electrochemical cell. Introducing the carbon dioxide into the electrolyte solution can comprise, for example, bubbling the carbon dioxide into the electrolyte solution. Once introduced into the electrolyte solution, the $CO_2$ can take a number of forms including carbon dioxide ($CO_2$) carbonate ($CO_3^{2-}$) or bicarbonate ($HCO_3^-$). One or more of these species can then contact the mixed-phase electrocatalyst, and react to form the product. It will be understood that the phrase "contacting the carbon dioxide with a mixed-phase electrocatalyst" encompasses contacting the mixed-phase electrocatalyst with any of the species formed upon introduction of the carbon dioxide into the electrolyte solution.

Any suitable electrolyte can be used. For example, the electrolyte can be selected to as to be compatible with carbon dioxide present in the system (e.g., so as not to precipitate upon introduction of carbon dioxide into the electrochemical cell). For example, the electrolyte can comprise potassium bicarbonate, sodium hydrogen carbonate, potassium chloride, potassium sulfate, or potassium phosphate. In certain embodiments, the electrolyte can comprise an alkali metal bicarbonate (e.g., potassium bicarbonate or sodium bicarbonate). By way of example, the electrolyte can comprise, for example, an aqueous solution of sodium bicarbonate.

The applied potential can be −0.10 V or less (e.g., −0.15 V or less, −0.20 V or less, −0.25 V or less, −0.30 V or less, −0.35 V or less, −0.40 V or less, −0.45 V or less, −0.50 V or less, −0.55 V or less, −0.60 V or less, −0.65 V or less, −0.70 V or less, −0.75 V or less, −0.80 V or less, −0.85 V or less, −0.90 V or less, −0.95 V or less, −1.0 V or less, −1.05 V or less, −1.10 V or less, −1.15 V or less, −1.20 V or less, −1.25 V or less, −1.30 V or less, −1.35 V or less, −1.40 V or less, −1.45 V or less, −1.50 V or less, −1.55 V or less, −1.60 V or less, −1.65 V or less, −1.70 V or less, or −1.75 V or less) vs. an Ag/AgCl reference electrode. The applied potential can be at least −1.8 V (e.g., at least −1.75 V, at least −1.70 V, at least −1.65 V, at least −1.60 V, at least −1.55 V, at least −1.50 V, at least −1.45 V, at least −1.40 V, at least −1.35 V, at least −1.30 V, at least −1.25 V, at least −1.20 V, at least −1.15 V, at least −1.10 V, at least −1.05 V, at least −1.0 V, at least −0.95 V, at least −0.90 V, at least −0.85 V, at least −0.80 V, at least −0.75 V, at least −0.70 V, at least −0.65 V, at least −0.60 V, at least −0.55 V, at least −0.50 V, at least −0.45 V, at least −0.40 V, at least −0.35 V, at least −0.30 V, at least −0.25 V, at least −0.20 V, or at least −0.15 V) vs. an Ag/AgCl reference electrode.

The applied potential can range from any of the minimum values described above to any of the maximum values described above. For example, the applied potential can be from −0.10 V to −1.8 V (e.g., from −0.15 V to −1.8 V, from −0.2 V to −1.8 V, from −0.25 V to −1.6 V, from −0.35 V to −1.0 V, or from −1.0 V to −1.6 V) vs. an Ag/AgCl reference electrode.

In some cases, the product can comprise at least two carbon atoms (e.g., two carbon atoms, or three carbon atoms). In some embodiments, the product can comprise acetate, formate, or a combination thereof. In certain embodiments, the acetate, the formate, or the combination thereof can be formed at a Faradaic efficiency of from 15% to 95% (e.g., from 15% to 50%, from 30% to 70%, or from 60% to 95%). In certain embodiments, the method can be selective for the formation of acetate over formate, such that the acetate is formed with at least two times greater (e.g., at least three times greater, at least four times greater, at least five times greater, or at least ten times greater) Faradaic efficiency than the formate.

Here Faradaic efficiency is defined as the ratio of moles of product to moles of electrons multiplied by the number of electrons required to form a single product molecule as given by the equation below:

$$\varepsilon_{Faradaic} = \frac{z \cdot n \cdot F}{Q}$$

where z is the number of electrons (e.g. z=8 for reduction of $CO_2$ to acetate and z=2 for reduction of $CO_2$ to formate), n the number of moles of acetate produced, F is Faraday's constant (F=96,485 C/mol), and Q is the total charge as determined by the current-time integral.

In some embodiments, the method can further comprise contacting the mixed-phase electrocatalyst with an electron scavenger. In some cases, contacting the mixed-phase electrocatalyst with the electron scavenger can comprise introducing the electron scavenger into an electrolyte solution present in the electrochemical cell. By way of example, the electron scavenger can comprise, for example, $O_2$, and contacting the mixed-phase electrocatalyst with the electron scavenger can comprise bubbling the $O_2$ into an electrolyte solution present in the electrochemical cell. Examples of alternative electron acceptors include, for example, triiodide, quinone, ferric ions, hydrogen peroxide, permanganate, nitrate, and methyl viologen. The electron scavenger can serve to stabilize the mixed-phase electrocatalyst during the reduction reaction.

In some cases, the method can further comprise impinging the electrocatalyst with electromagnetic radiation having a first wavelength and a first irradiance. In these embodiments, the electrochemical cell can comprise a photoelectrochemical cell. The electromagnetic radiation can be continuous radiation or pulsed radiation. In some cases, the first wavelength of the electromagnetic radiation can be, for example, from 300 nm to 800 nm. In some cases, the first irradiance of the electromagnetic radiation can be, for example, from 0.1 W/m$^2$ to 1100 W/m$^2$, or the equivalent in pulsed irradiation. In other embodiments, the methods described herein can be performed in the absence of illumination.

By way of non-limiting illustration, examples of certain embodiments of the present disclosure are given below.

EXAMPLES

Example 1

Efficient Electrochemical $CO_2$ Reduction to Acetate on Iron-Copper Oxide Catalysts Herein, the conversion of $CO_2$ to acetate with 80% Faradaic efficiency using a mixed Fe—Cu oxide catalyst at −0.4 V bias vs. Ag/AgCl with and without visible light illumination is demonstrated. Analysis shows that the selective catalyst is a mixed phase material made up of $CuFeO_2$ and CuO. By varying the Fe:Cu atomic fraction from 1.3 to 0.1, it is possible to tune the selectivity for $CO_2$ reduction from primarily acetate to primarily formate. These results identify a new low cost, earth abundant material capable of synthesizing an energy-dense liquid directly from $CO_2$ and show that selectivity for $CO_2$ reduction can be tuned by controlling catalyst composition in mixed Fe—Cu oxide catalysts.

Background

A major need exists to develop renewable sources to meet the growing global energy demand. The environmental consequences of continued fossil fuel consumption as well as the economic uncertainty of hydrocarbon sources are strong motivations for developing catalysts capable of reducing $CO_2$ to a high energy density fuel or other value added products. However, at the heart of this challenge is the complex chemistry associated with C—C bond coupling during $CO_2$ reduction.

Although a large amount of work has been done to elucidate the mechanistic details of $CO_2$ chemistry, surface design parameters for heterogeneous catalysts capable of efficient C—C bond coupling from $CO_2$ is a subject of intense current interest. While mixed Cu—Fe oxide catalysts have been investigated for photo-electrochemical $CO_2$ reduction, existing systems have not exhibited efficient C—C bond coupling. Nevertheless, this material system remains of potential interest because the catalyst is formed from low-cost, earth abundant transition metal oxides. In particular, Fe is the most abundant and least expensive transition metal catalyst available. As a consequence, it would be extremely desirable to develop Cu—Fe oxide catalysts capable of reducing $CO_2$.

Materials and Methods

Unless otherwise specified all chemicals were purchased from Sigma Aldrich and used without further purification. FTO glass was purchased from Sigma Aldrich (10 Ω/sq). Ag/AgCl aqueous reference electrode was purchased from BASi. Carbon dioxide ($CO_2$) (99.9%) and argon (99.998%) were purchased from Praxair. Electrolyte solutions were prepared with milli-Q water system (Synergy® UV Remote Water Purification System).

Electrode Fabrication

All of the catalysts were prepared using an electrodeposition technique in a custom designed single compartment electrochemical cell using an Ag/AgCl aqueous reference electrode with a counter electrode prepared by sputter coating 20 nm of titanium on a glass slide, followed by 100 nm of platinum. Fluorine-doped tin oxide (FTO) coated glass substrates were cut into 1.9 cm×1.9 cm square pieces for use as working electrodes. During electrodeposition, the temperature was controlled using an oil bath on a hotplate with a thermometer. The FTO glass was cleaned with piranha solution (3 parts sulphuric acid to 1 part hydrogen peroxide) at 90° C. for 10 minutes. After piranha cleaning, the substrates were rinsed and sonicated for 10 minutes in Milli-Q water before being blown dry with nitrogen for electrodeposition. Controlled potentials were applied using a Bio-logic® SP-50 potentiostat.

CuO Electrode: $Cu_2O$ films were electrodeposited onto FTO substrates in dimethyl sulfoxide (DMSO) solutions of 0.01M $Cu(NO_3)_2.6H_2O$. The film was deposited at a temperature of 60° C. with a potential of −0.3 V vs. Ag/AgCl. To convert the as-deposited $Cu_2O$ film to CuO film, the sample was annealed in air at a temperature of 650° C. for 3 h.

$Fe_2O_3$ Electrode: The $Fe_2O_3$ electrode was prepared by an anodic deposition procedure. First, α-FeOOH films were electrodeposited in aqueous solutions of 0.02 M $FeCl_2.5H_2O$ onto FTO substrates by applying a potential of 1.2 V vs. Ag/AgCl at a temperature of 75° C. The as-deposited film was then annealed in air at a temperature of 520° C. for 30 min.

Fe—Cu Mixed Oxide Electrode: Fe—Cu mixed oxide electrodes were prepared by cathodic deposition on FTO substrates using a 1 mM $Cu(NO_3)_2.6H_2O$, 3 mM $Fe(ClO_4)_3$, and 100 mM $KClO_4$ plating solution in DMSO. The deposition was performed at 75° C. with an applied potential of −0.3 V vs. Ag/AgCl. These samples were annealed in air at 650° C. for 3 h. The film thickness is estimated to be generally 280 nm based on cross sectional SEM image.

The Fe—Cu mixed oxide electrodes with different Fe/Cu composition were prepared by the same procedure but tuning the $Cu(NO_3)_2.6H_2O$ concentration in the plating solution from 1 mM to 2 mM and 3 mM.

Surface Analysis

Sample electrodes were analyzed with X-ray photoelectron spectroscopy (Kratos Axis Ultra). A monochromatic Al Kα source (hv=1,486.6 eV) was operated at 120 W with a 12 kV accelerating voltage. The base pressure generated in the ion-pumped chamber was 1.6×10$^{-9}$ mbar. Atomic fractions were determined by peak area fittings followed by normalization to elemental sensitivity factors.

Samples were prepared for electron diffraction by gently scraping the thin film catalyst from the FTO substrate and transferring to a lacey carbon TEM grid. Electron diffraction was performed using a Philips CM12 TEM equipped with a tungsten cathode operating at 120 kV. A selected area aperture was used to limit the electron diffraction pattern to an area of interest. Patterns were analyzed by radial integration using Image J. A polycrystalline Al sample was used for calibration. The pattern was converted to units of 2θ for comparison with published XRD data using the known wavelength of a Cu Kα X-ray diffractometer.

Catalyst morphology and elemental mapping by energy dispersive X-ray spectroscopy (EDX) was obtained using a Carl Zeiss Ultra 55 Plus field-emission SEM.

ICP-MS analysis of the Fe—Cu mixed oxide film and the post-reaction electrolyte were conducted on a Perkin-Elmer Nexion 350D Inductively Coupled Plasma UCT Mass Spectrometer. 10 mL of phosphoric acid 20% was used to dissolve the entire catalyst film under sonication, the post-reaction electrolyte was directly collected and measured.

Photo-Electrochemical Measurements

A Biologic® SP-50 potentiostat was used for all electrochemical experiments. A warm white-light LED was used as the light source (Thorlabs, MWWHL3, 0.9 mA/cm$^2$). The output of this lamp was collimated, and the power density used for all experiments was 100 mW/cm$^2$. Linear sweep voltammetry (LSV) was performed in bulk electrolysis cell with a quartz window. A three-electrode system was employed consisting of a Ag/AgCl reference electrode, a Pt counter electrode, and the as-prepared working electrode. The sweep rate for LSV was 20 mV/s. The controlled-potential electrolysis was performed in a custom Poly (etheretherketone) (PEEK) reactor cell. The PEEK reactor consisted of two pieces, with Ag/AgCl reference electrode contained in one part and a Pt mesh counter electrode contained in the other. These two halves were pressed together with O-ring in between and clamped tightly to create a single cell with a 4 mL dead volume. The working electrode was clamped against a second O-ring on the front face of the PEEK reactor to seal the cell, and the catalyst was illuminated from the backside of the FTO substrate during electrolysis. The active illuminated area of the catalyst in this PEEK cell was 1.5 cm$^2$. The cell was filled with electrolyte (4 mL) and purged with Ar or $CO_2$ via Teflon tubing for an hour before electrolysis began. Experiments were performed in both sodium bicarbonate electrolyte (0.1 M) and in phosphate-buffered (0.1 M, pH=7.0) electrolyte with similar results.

Product Detection

Ion chromatography (Dionex ICS-2000 IC) and $^1$H-NMR (400 MHz DPX) were used to detect and quantify product yield. $^1$H-NMR was collected using a mixture of post electrolysis solution and $D_2O$ with a volume ratio of 4:1. In IC analysis, 4.5 mM $Na_2CO_3$ and 1.4 mM $NaHCO_3$ buffer was used as the mobile phase with a flow rate of 1 mL/min. The standard addition method was applied to determine the concentration of acetate in the post reaction solution. To accomplish this, additions of known concentrations of sodium acetate standard were added to the sample matrix, and a linear regression was used to determine the concentration of acetate in the sample matrix. Knowing the acetate yield, the Faradaic efficiency can be derived from the following equation:

$$\varepsilon_{Faradaic} = \frac{z \cdot n \cdot F}{Q}$$

where z is the number of electrons (e.g., z=8 for reduction of $CO_2$ to acetate), n the number of moles of acetate produced, F is Faraday's constant (F=96,485 C/mol), and Q is the total charge as determined by the current-time integral.

Gas phase products in head space of the photoelectrochemical cell were analyzed using an Agilent 7890B gas chromatograph (GC) equipped with flame ionization detector (FID) and thermal conductivity detector (TCD). A gas recirculation pump was used to homogenize the gas composition. A fused silica Supelcowax capillary column (Supelcowax 10, 30m×0.32 mm×0.5 µm) was used for product separation.

Results and Discussion

Figure 2:
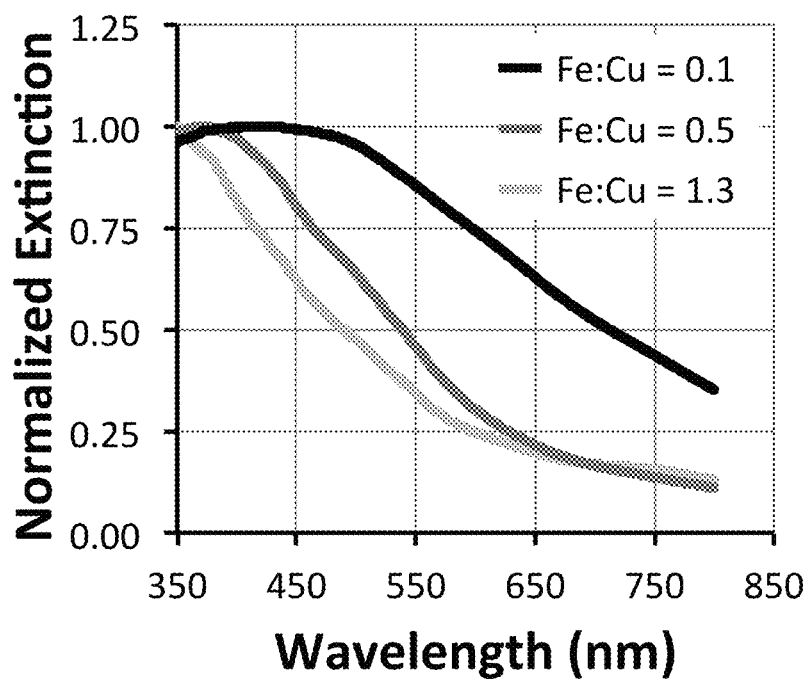
FIG. 2 is a plot of the normalized UV/Vis extinction spectra of Fe—Cu oxide catalysts as a function of Fe:Cu relative composition on FTO substrates. Results show a decreasing band gap with increasing Cu concentration in these catalysts.
Figure 3:
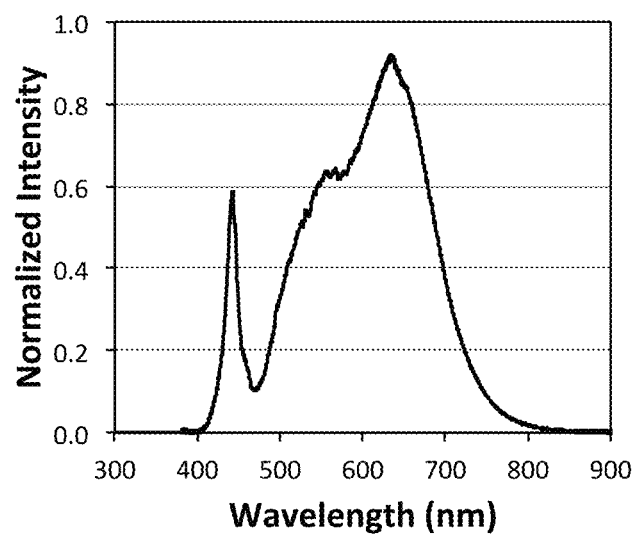
FIG. 3 shows the spectral profile of the white light source used for photo-electrocatalysis. The lamp was a high-power LED, warm white light (Thorlab, model MWWHL3). The power density of the light on the catalyst during electrolysis was 100 mW/cm$^2$.

In this example, the ability of a Fe—Cu mixed oxide catalyst to selectively reduce $CO_2$ to acetate at a Faradaic efficiency of 80% is demonstrated. The Fe—Cu mixed oxide catalyst can be prepared by electrodeposition on FTO glass substrate using a dimethyl sulfoxide (DMSO) plating solution containing 1 mM $Cu(NO_3)_2$, 3 mM $Fe(ClO_4)_3$ and 0.1 M $KClO_4$ electrolyte. The as-deposited catalysts were annealed at 650° C. for 3.5 hours in the air. As shown in FIGS. 1-3, the UV-Vis extinction spectrum of the catalysts showed that the catalysts exhibited a band gap of approximately 1.9 eV, which lies between the band gaps observed for $Fe_2O_3$ (2.1 eV) and CuO (1.5 eV) prepared by similar methods.

Figure 4:
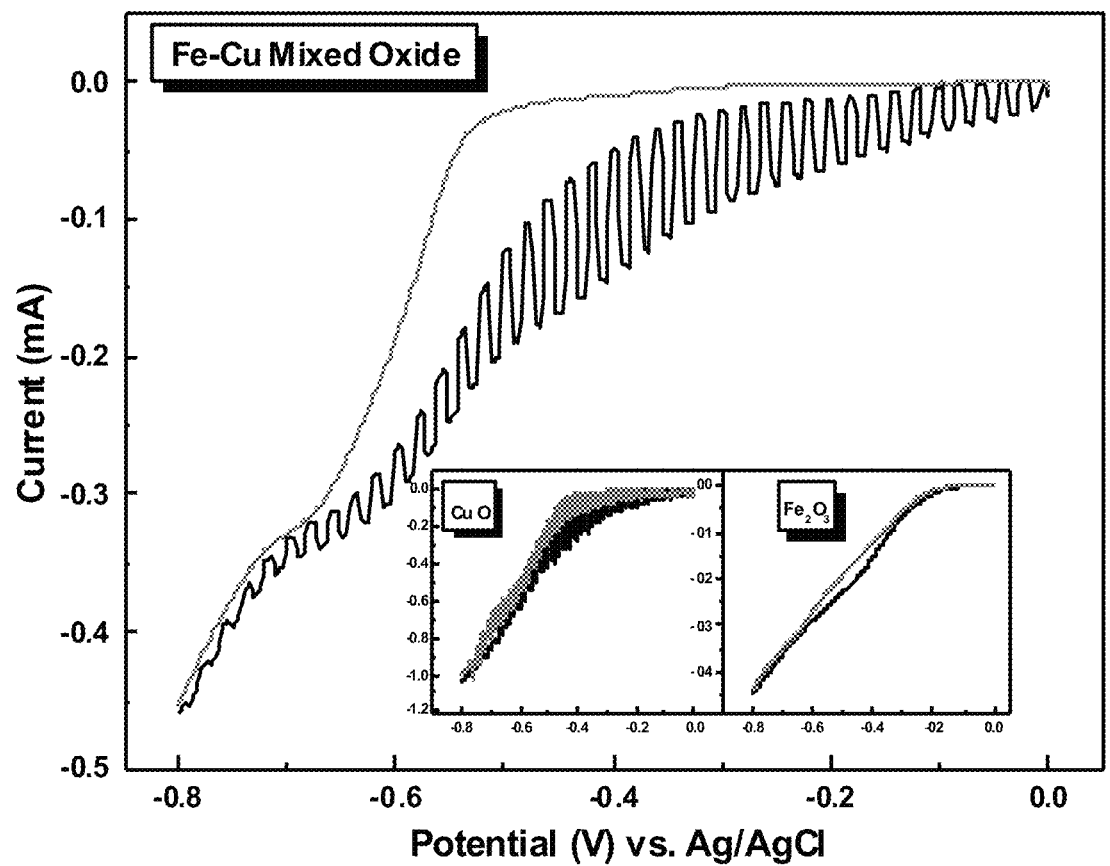
FIG. 4 shows linear sweep voltammetry of Fe—Cu mixed oxide in 0.1 M sodium bicarbonate electrolyte during illumination with a chopped light source (100 mW/cm$^2$). The black traces show results for $CO_2$-saturated electrolyte while the gray traces show results following 1 h purging with Ar gas. Insets show results for pure $Fe_2O_3$ and CuO for comparison.

FIG. 4 shows the results of linear sweep voltammetry (LSV) under illumination in $CO_2$-saturated electrolyte compared to Ar-purged electrolyte. By comparing results for Ar— and $CO_2$-purged electrolyte, one can specifically observe if charge transfer is selective to $CO_2$ compared to $H_2O$ or $H^+$. To maximize selectivity for $CO_2$ reduction, an ideal case would be to design a material that can readily transfers photo-excited electrons to $CO_2$ instead of $H_2O$. This exact result is demonstrated in FIG. 4. As shown in FIG. 4, the Fe—Cu mixed oxide catalyst displays high photocurrent in $CO_2$ saturated electrolyte, but surprisingly no photocurrent is measured in Ar-purged electrolyte. Comparing the results of this LSV experiment to similar measurements for pure CuO and pure $Fe_2O_3$ (FIG. 4 insets), CuO shows high photocurrent in both Ar- and $CO_2$-purged cases, suggesting that the photocurrent on CuO is not selective to $CO_2$. Alternately, in the case of pure $Fe_2O_3$ no photocurrent is observed for either Ar- or $CO_2$-purged cases, indicating that $Fe_2O_3$ is not active as a photocatalyst for $H_2$ evolution or for $CO_2$ reduction. These combined results suggest that electron transfer from these Fe—Cu mixed oxide catalysts is uniquely selective to $CO_2$ over $H^+$.

Figure 5:
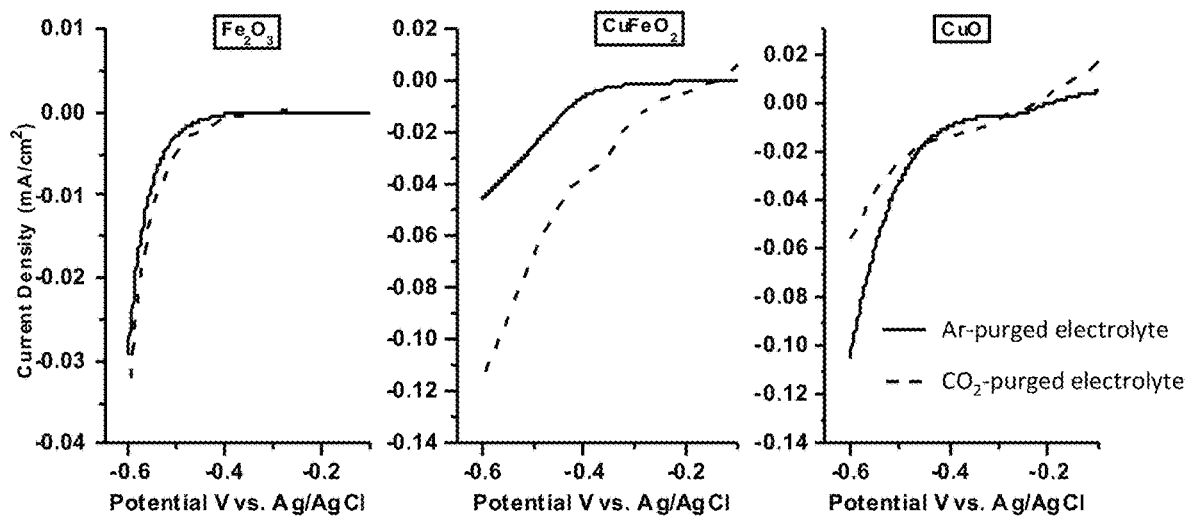
FIG. 5 shows linear sweep voltammetry of Fe—Cu mixed oxide in 0.1 M sodium bicarbonate electrolyte taken in the dark. The dashed traces show results for $CO_2$-saturated electrolyte while the solid traces show results following 1 h purging with Ar gas.

LSV curves were also measured without light to characterize the redox behavior of the pure CuO, pure $Fe_2O_3$ and mixed Fe—Cu oxide catalysts. As shown in FIG. 5, the Fe—Cu mixed oxide catalysts show a pronounced reduction peak at approximately −0.35 V vs. Ag/AgCl, and a similar peak is observed in the CuO catalyst. This reduction peak has previously been assigned as the reduction of $Cu^{2+}$ to $Cu^+$. However, based on the observed enhancement in $CO_2$ saturated solution compared to Ar-purged electrolyte for the Fe—Cu mixed oxide catalyst, it is possible that this peak may be the combination of a $Cu^I$ reduction peak and a follow-up $CO_2$ reduction peak.

Figure 6A:
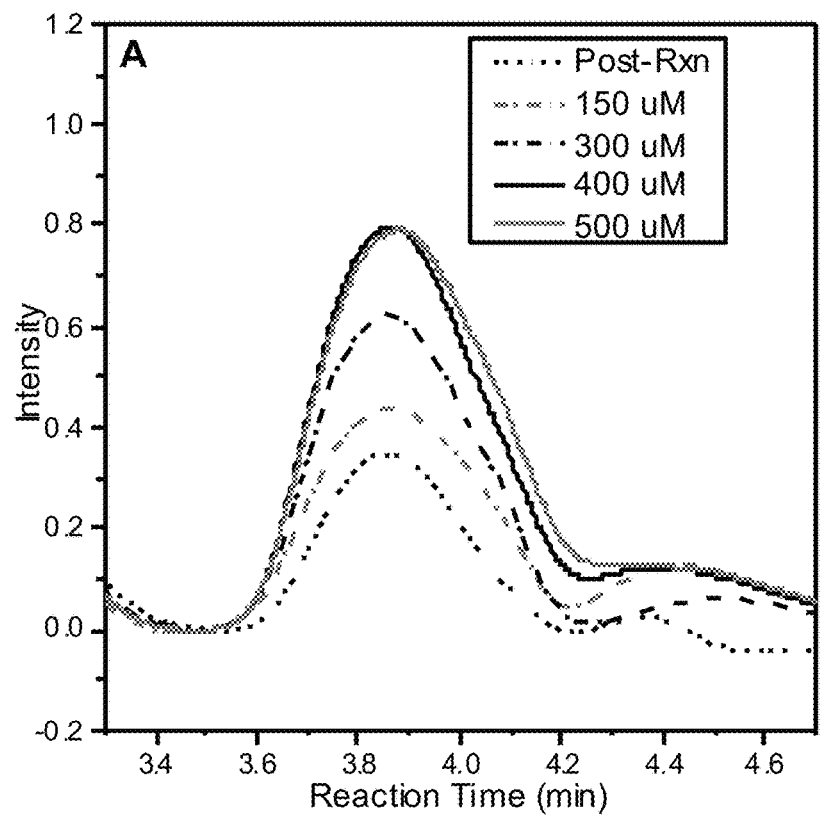
FIGS. 6A-6B illustrate the quantification of acetate by standard addition.
Figure 6B:
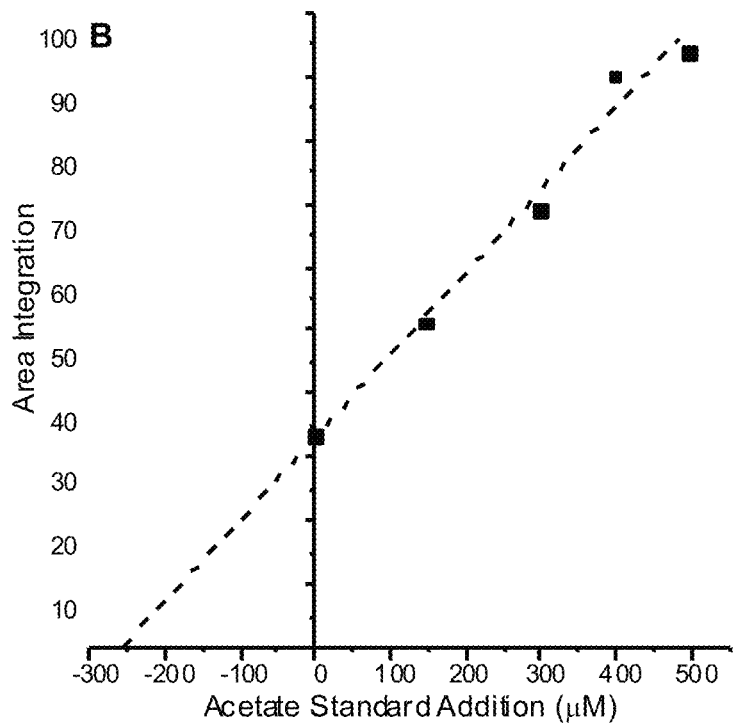

Kinetic studies reveal that acetate is the primary reaction product of photo-electrolysis on the Fe—Cu mixed oxide catalyst. Table 1 shows the yield and Faradaic efficiency of acetate production on the selective Fe—Cu mixed oxide catalysts as well as pure CuO and $Fe_2O_3$ catalysts after 2 hours of controlled potential electrolysis at −0.4 V vs. Ag/AgCl under constant white light illumination. Standard addition measurements by ion chromatography were used to quantify the yield of acetate following reaction (see FIGS. 6A-6B). 142±15 µM acetate was detected as the main product following electrolysis in 0.1 M sodium bicarbonate, corresponding to a Faradaic efficiency of 76%. Product detection following electrolysis in 0.1 M sodium bicarbonate solution under Ar saturated conditions revealed that 80±15 µM acetate was also formed under these conditions. Similar results for bicarbonate reduction have been observed previously, and are a result of the equilibrium between bicarbonate and $CO_2$ in solution ($2HCO_3^- \leftrightarrows CO_2 + CO_3^{2-} + H_2O$). Although the equilibrium concentration of $CO_2$ is small under these conditions, the dissociation of bicarbonate near the electrode surface leads to $CO_2$ adsorption, which shifts the bicarbonate equilibrium toward $CO_2$ and is often sufficient to sustain $CO_2$ reduction.

TABLE 1

Results of photo-electrolysis experiments performed at −0.4 V bias vs. Ag/AgCl during illumination.

| Catalyst | Electrolyte[1] | Purge Gas | [Acetate] ($\mu M$)[2] | Faradaic Efficiency[2] |
|---|---|---|---|---|
| Fe—Cu Mixed Oxide | $H_2PO_4^-$ | $CO_2$ | 257 ± 15 | 76 ± 5% |
| Fe—Cu Mixed Oxide | $H_2PO_4^-$ | Ar | 13 ± 35 | 8 ± 20% |
| Fe—Cu Mixed Oxide | $HCO_3^-$ | $CO_2$ | 142 ± 15 | 80 ± 8% |
| Fe—Cu Mixed Oxide | $HCO_3^-$ | Ar | 80 ± 15 | 48 ± 8% |
| $Fe_2O_3$ only | $HCO_3^-$ | $CO_2$ | 9 ± 35 | 2 ± 9% |
| CuO only | $HCO_3^-$ | $CO_2$ | 11 ± 35 | 7 ± 27% |

[1]Electrolyte concentrations were 0.1M Phosphate electrolyte was buffered at pH = 7.
[2]Uncertainty values represent the standard error obtained by linear regression of ion chromatography data In order to confirm that dissolved $CO_2$ (either from $CO_2$ purging or from bicarbonate dissociation) is the only carbon source for the observed acetate formation in these studies, additional experiments were performed in phosphate buffered electrolyte (pH=7). In Ar-purged, phosphate-buffered electrolyte, only 13±35 μM acetate was detected (within error of zero) following electrolysis, compared to greater than 250 μM and 80% Faradaic efficiency from the same catalyst under identical conditions following $CO_2$ purging. Pure $Fe_2O_3$ and pure CuO catalysts fabricated using the identical method and post-treatment as the selective Fe—Cu mixed oxide catalyst were also tested, and no acetate was observed in either case.

Figure 7:
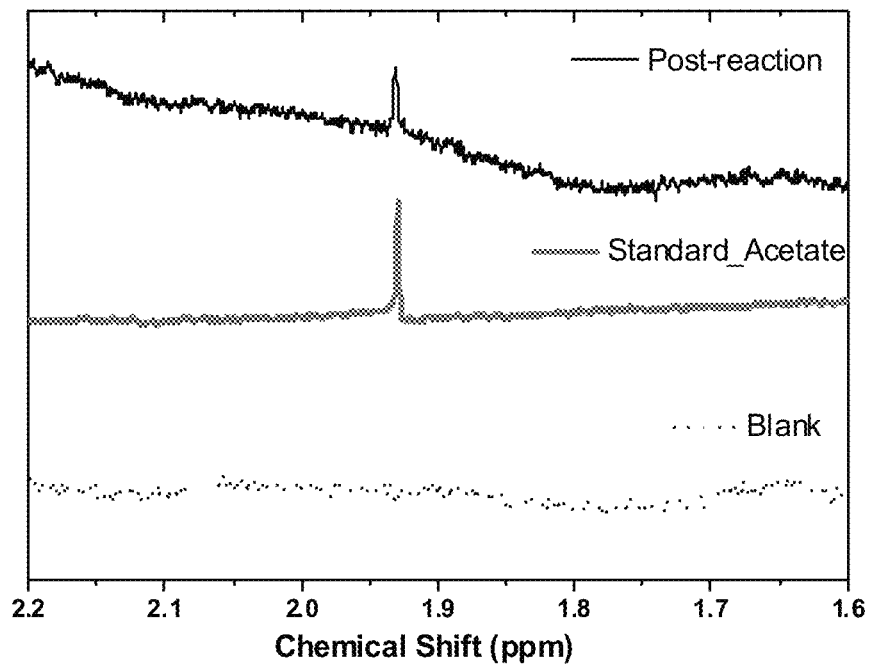
FIG. 7 shows the $^1$H-NMR spectrum of the pre-reaction electrolyte (dotted trace), 200 μM acetate standard (gray trace), and the post-electrolysis electrolyte (black).
Figure 8:
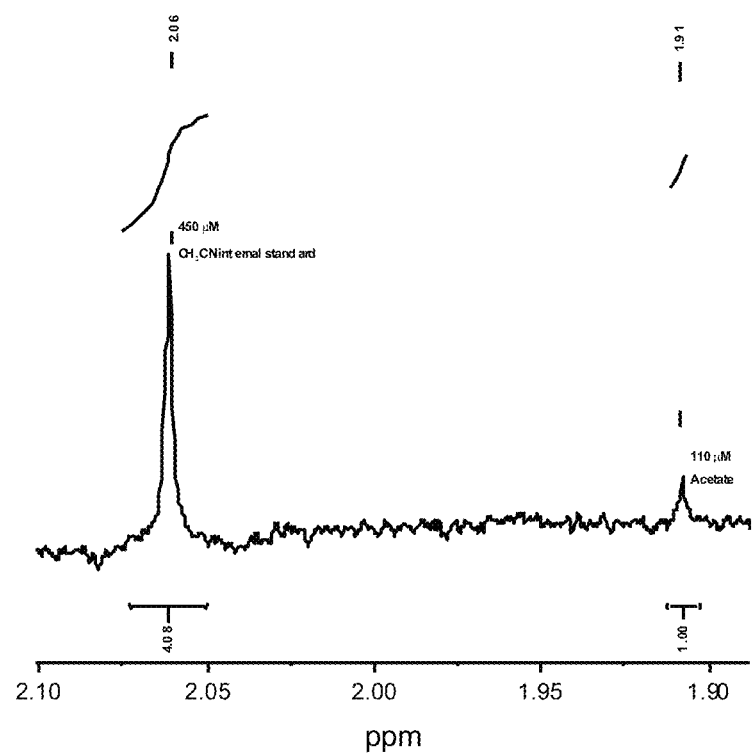
FIG. 8 illustrates methods of acetate quantification by $^1$H-NMR using acetontrile as an internal standard.

In addition to standard addition experiments using ion chromatography, $^1$H-NMR was used to further confirm the identity and yield of the acetate product. As shown in FIG. 7, the peak showing a chemical shift of 1.93 ppm from post-electrolysis solution (black trace) matches well with acetate standard sample (gray trace), which represents the $CH_3$ group of deprotonated acetate. $^1$H-NMR of pre-reaction electrolyte (FIG. 7, dashed trace) was also collected in order to exclude the possibility of any impurity in the electrolyte. These results further confirm the formation of acetate during photo-electrolysis using the Fe—Cu oxide catalyst. Quantitative product analysis of post-electrolysis electrolyte was also performed by NMR studies using acetonitrile as internal standard. See FIG. 8. 110 μM of acetate was confirmed by comparing integrated signal intensities of the internal standard, and this yield corresponded to a Faradaic efficiency of 78%, which closely matches the Faradaic efficiency determined by ion chromatography.

Figure 9:
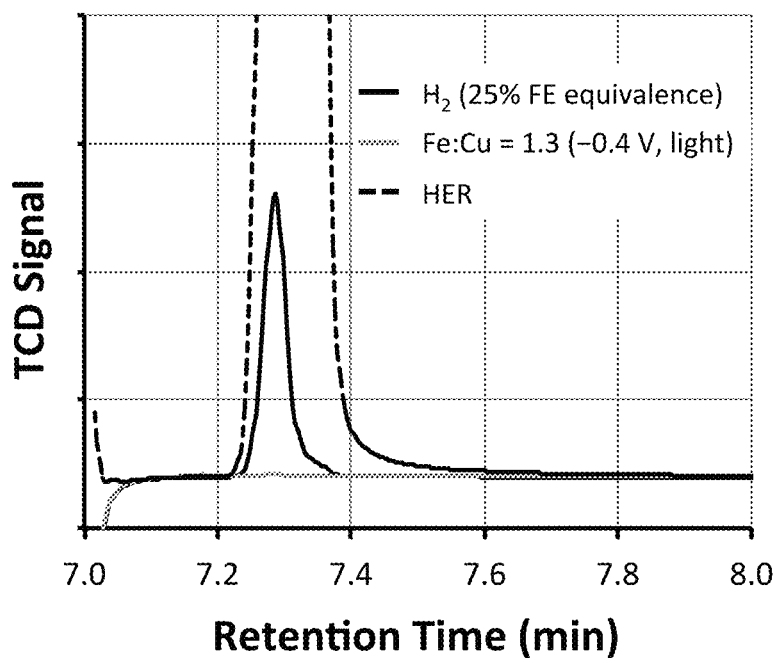
FIG. 9 illustrates $H_2$ detection during headspace analysis using gas chromatography with a thermal conductivity detector. The peak at approximately 7.3 min retention time corresponds to $H_2$. The gray trace with almost no response shows the result for headspace analysis following photo-electrolysis on the Fe—Cu mixed oxide (bulk Fe:Cu=ratio 1.3) catalyst. Identical chromatograms were obtained for catalysts having bulk Fe:Cu ratios of 0.5 and 0.1. The black trace shows results for standard $H_2$ diluted in $N_2$ to represent the concentration corresponding to 25% Faradaic efficiency for the Fe—Cu=1.3 catalyst. The dashed trace shows results for $H_2$ evolution on this same catalyst operating at –1.8 V vs. Ag/AgCl. These two control experiments confirm the experimental ability to detect $H_2$ and demonstrate that only trace $H_2$ is formed during photo-electrolysis on this catalyst at –0.4 V vs. Ag/AgCl.

Gas chromatography (GC) was also used to analyze the headspace gas in order to investigate the complete product distribution. See FIG. 9. Using the analysis of standard gasses, CO, methane, ethane, ethylene, methanol, and ethanol were all detected at levels corresponding to less than 0.1% Faradaic selectivity for these reactions. Further, only small amounts of CO and $H_2$ were observed, corresponding to a combined Faradaic efficiency of less than 1%. Consequently, it can be concluded that the majority of the excess current in these reactions goes toward reduction of the catalyst The activity of Fe—Cu mixed oxide catalysts as a function of relative Fe and Cu composition was also investigated. To accomplish this, three catalysts were prepared by electrodeposition followed by annealing as described above except that the molar ratio of $Cu(NO_3)_2$ to $Fe(ClO_4)_3$ used in the plating solution was varied between 1:3 and 3:3 to prepare catalysts with increasing Cu concentration. The composition of the plating solutions used to prepare the three catalysts is detailed in Table 2 below.

The Fe:Cu atomic ratio in bulk samples of the catalysts was determined by dissolution followed by ICP-MS analysis. Briefly, the catalysts were dissolved in 20% phosphoric acid. The resulting solutions were then analyzed by ICP-MS. The three catalysts had a Fe:Cu atomic fraction (in the bulk) of 1.3, 0.5, and 0.1, respectively.

Figure 10:
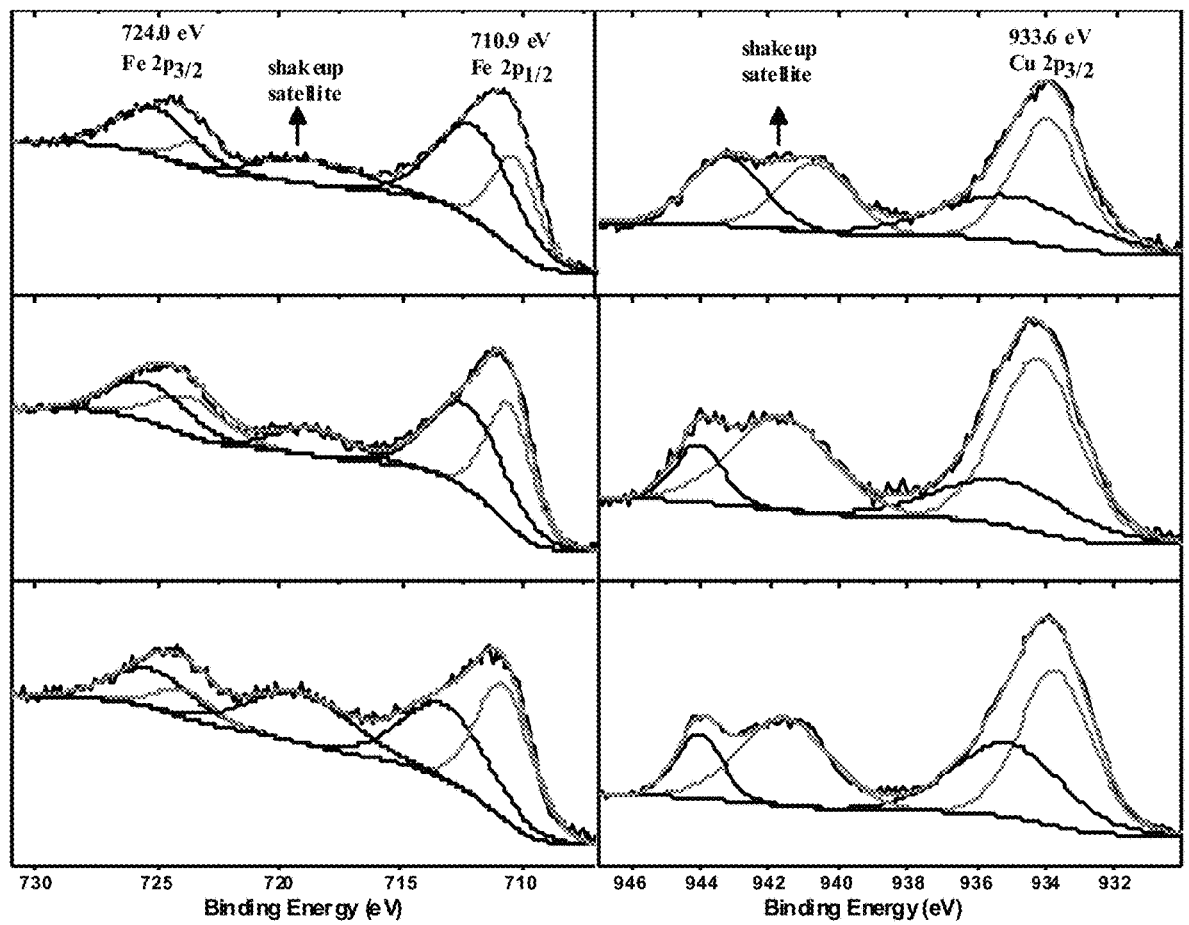
FIG. 10 shows the XPS peak fitting of the Cu $2p_{3/2}$ and Fe 2p states in the as-prepared Fe—Cu oxide catalysts with various Fe:Cu relative compositions. Panels (a) and (b): Fe:Cu (bulk)=1.3; Panels (c) and (d): Fe:Cu (bulk)=0.5; Panels (e) and (f): Fe:Cu (bulk)=0.1. Correcting the integrated peak areas for the elemental sensitivity factors allowed for the determination the Fe:Cu atomic fraction at the surface of each catalyst. A comparison of surface Fe:Cu atomic fractions determined by XPS compared to bulk atomic fractions determined by ICP-MS is provided in Table 2.

The Fe:Cu atomic ratio in each catalyst was also measured by fitting XPS spectra (the Cu $2p_{3/2}$ and Fe 2p states), as shown in FIG. 10. XPS is surface sensitive and allows for quantification of the Fe:Cu atomic ratio at the catalyst surface (as compared to ICP-MS, which measures the Fe:Cu atomic ratio in the bulk). The results are shown in Table 2. As shown in Table 2, smaller total Fe:Cu atomic ratios were measured by ICP-MS as compared to surface measurements by XPS. This suggests that the catalysts exhibit Fe enrichment at the catalyst surface.

TABLE 2

Summary of the ICP-MS and XPS analysis of Fe—Cu oxide catalysts prepared from plating solutions of various Fe:Cu molar ratios. For ICP analysis catalysts (3.0 cm$^2$) were dissolved in 10.0 mL of 20% phosphoric acid. The post-reaction electrolyte (4.0 mL total volume) was also analyzed by ICP-MS confirming the reductive dissolution of Fe from the catalyst surface during photo-electrolysis.

| Plating solution (Fe:Cu ratio) | Fe (ppm) | Cu (ppm) | Fe:Cu (ICP) | Fe:Cu (XPS) |
|---|---|---|---|---|
| Fe:Cu = 3:1 | 11.9 | 10.5 | 1.3 | 1.2 |
| Fe:Cu = 3:2 | 9.0 | 19.7 | 0.5 | 0.9 |
| Fe:Cu = 3:3 | 3.1 | 24.8 | 0.1 | 0.5 |
| Post-Reaction Electrolyte | 1.8 | 0.1 | — | — |
| Blank Electrolyte | 0.3 | 0.04 | — | — |

Figure 11A:
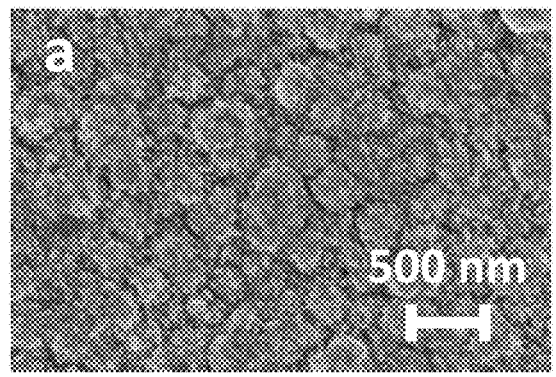
FIGS. 11A-11C show SEM images of the as-prepared catalysts with bulk Fe:Cu atomic fraction of 1.3 (FIG. 11A), 0.5 (FIG. 11B), and 0.1 (FIG. 11C) as determined by ICP-MS.
Figure 11B:
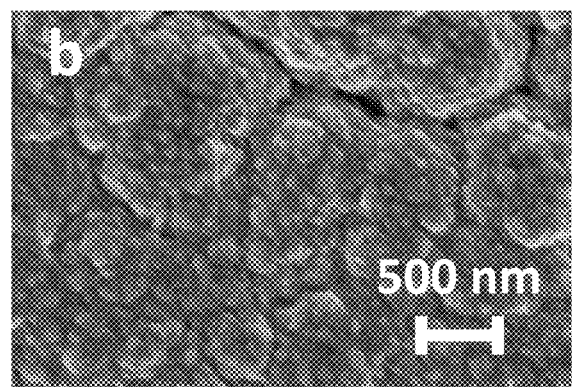
Figure 11C:
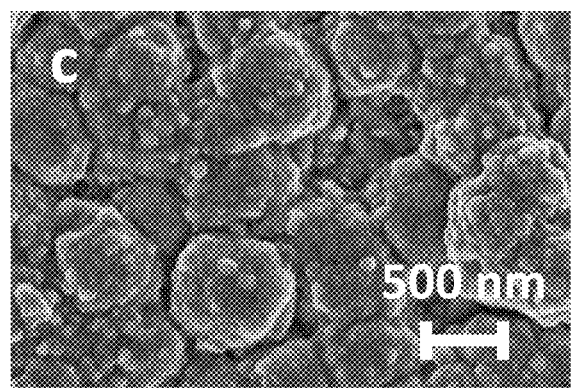
Figure 11D:
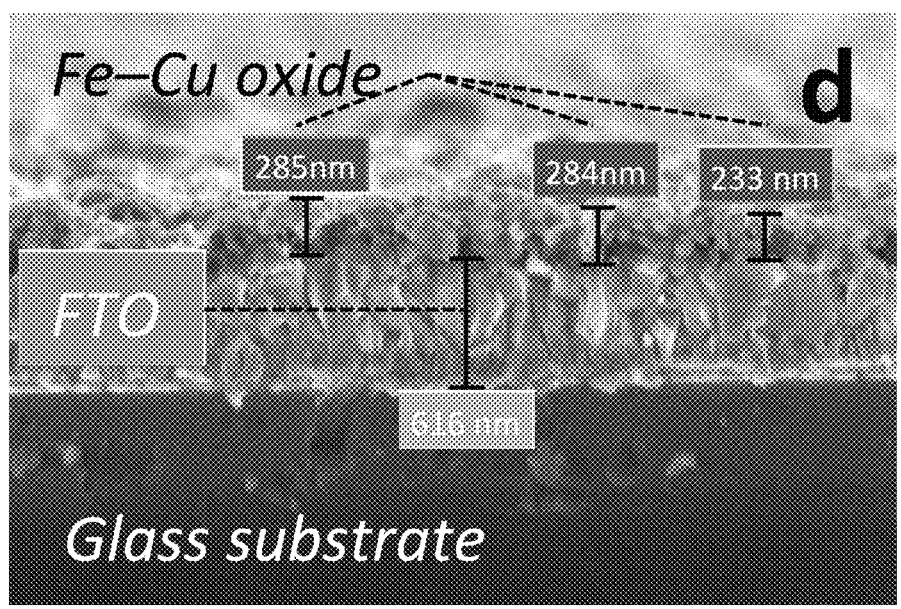
FIG. 11D shows a cross-sectional SEM image of a catalyst with a bulk Fe:Cu atomic fraction of 1.3 as determined by ICP-MS.

FIGS. 11A-11C show SEM images of these three catalysts with increasing Cu concentration. These images show that the thin film electrode has a porous structure consisting of Fe—Cu oxide aggregates several hundred nm in size. The morphology is similar as a function of composition, except that the feature size is smaller for the case of the most Fe-rich catalyst (bulk Fe:Cu=1.3). Additionally, TEM images show that the grain size also seems to decrease slightly as a function of increasing Fe:Cu atomic fraction. FIG. 11D shows the cross-sectional SEM image of the as-prepared catalyst with a bulk Fe:Cu atomic fraction of 1.3, indicating that the catalyst is approximately 280 nm thick. The optical properties of these electrodes were also investigated by UV/Vis spectroscopy. The catalysts were found to display a decreasing band gap with increasing Cu concentration.

Figure 11E:
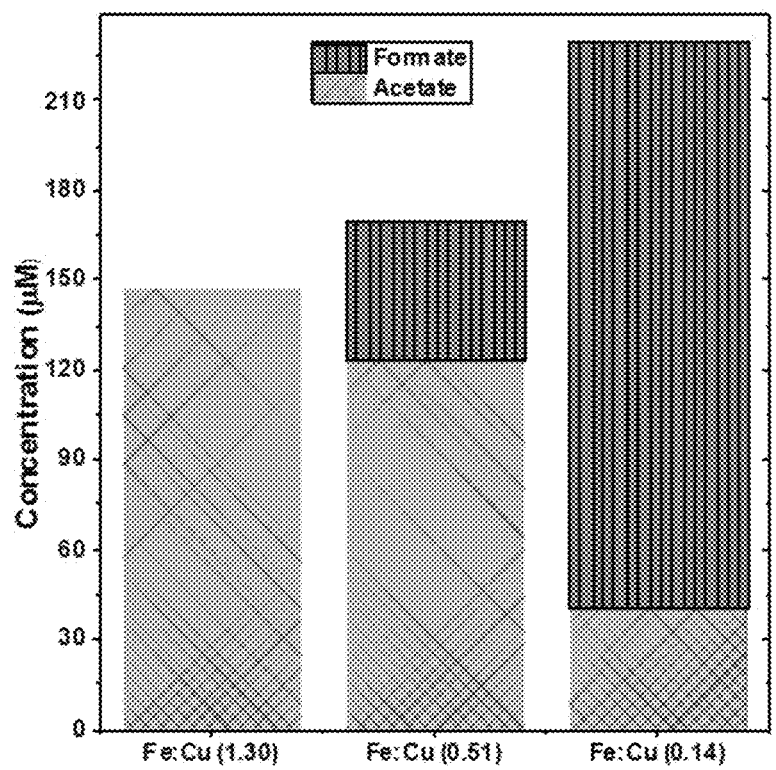
FIG. 11E shows the concentration of acetate and formate in post-reaction electrolyte following electrolysis on Fe—Cu oxide catalysts with various bulk Fe:Cu atomic fractions (as determined by ICP-MS).
Figure 11F:
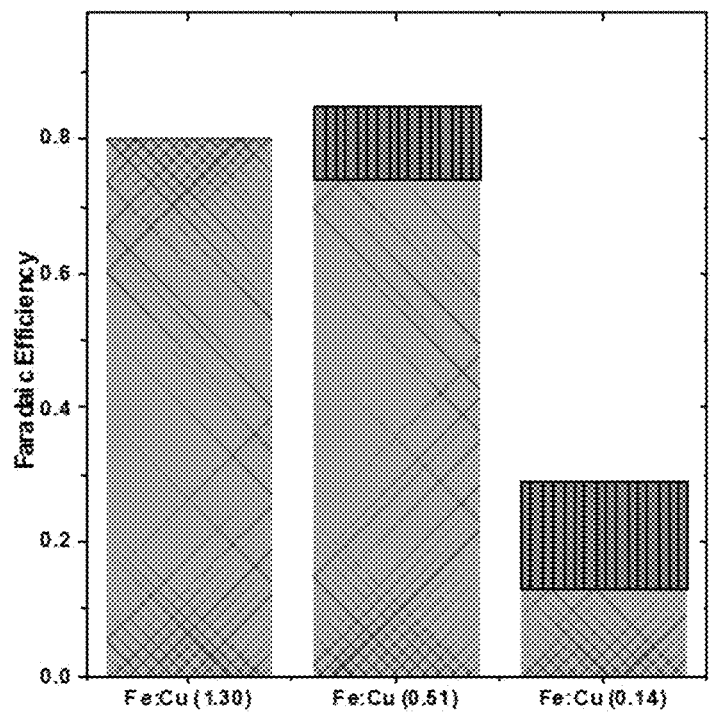
FIG. 11F shows the corresponding Faradaic efficiencies of Fe—Cu oxide catalysts with various bulk Fe:Cu atomic fractions (as determined by ICP-MS).

FIG. 11E shows the yields of acetate and formate during photo-electrolysis on mixed Fe—Cu oxide catalysts as a function of decreasing bulk Fe:Cu atomic fraction, and FIG. 11F shows the corresponding Faradaic efficiency. Fe—Cu mixed oxide can be selective for formate production from $CO_2$. As shown in FIG. 11E, formate is the primary reaction product if the concentration of Cu is increased in the catalyst relative to Fe. As shown in FIGS. 11E and 11F, for the catalyst with a bulk Fe:Cu atomic fraction of 1.3, acetate is the primary reaction product with a Faradaic selectivity of 80%. However, as the Cu concentration is increased, the rate of formate production increases and the yield of acetate decreases, with formate becoming the dominate reaction product at an Fe:Cu atomic fraction of 0.1. FIG. 11F shows that as formate becomes the primary reaction product, the overall Faradaic efficiency for $CO_2$ reduction decreases. Further, even in the case of the highest Cu concentration tested (Fe:Cu atomic fraction=0.1), $H_2$ production as measured by GC head space analysis accounts for <1% of the total current. This suggests that the majority of the excess current in these reactions goes toward reduction of the catalyst.

Given the current profile for these photo-electrochemical reactions and the absolute amount of Cu and Fe in the thin film electrode as quantified by ICP-MS, catalyst reduction can readily account for the remaining Faradaic efficiency. Table 3 below includes calculations showing the Faradaic efficiency lost due to catalyst reduction. The amount of Fe and Cu used to calculate the catalyst reduction current was determined by ICP-MS analysis of the dissolved catalyst as described above. Fe was assumed to exist as $Fe^{3+}$ in the $CuFeO_2$ delafossite phase. Equal moles of Cu were assumed to exist as $Cu^{1+}$ also in the $CuFeO_2$ delafossite phase. The remaining Cu was assumed to exist as $Cu^{2+}$ in CuO. This is consistent with electron diffraction and depth profiling XPS measurements as described in detail above. Excess current not producing either acetate or formate can be readily accounted for by assuming a combination of Fe' reductive dissolution and/or the reduction of the catalyst to Fe and Cu metal. This observation is consistent with reports that show fast catalyst reduction and low overall efficiency for $H_2$ during photo-electrochemical $H_2$ evolution on Fe—Cu oxide electrodes.

TABLE 3

Calculations showing the Faradaic efficiency lost due to catalyst reduction. All current integrals are given in units of µmol of electrons. As shown the remaining current that does not result in production of either acetate or formate can be readily accounted for by catalyst reduction.

|  | Fe:Cu = 1.3 | Fe:Cu = 0.5 | Fe:Cu = 0.1 |
|---|---|---|---|
| Current Integral | 5.4 | 4.4 | 9.1 |
| Faradaic Efficiency (Acetate + Formate) | 80% | 84% | 28% |
| Remaining Current | 1.1 | 0.7 | 6.6 |
| Catalyst Reduction Current (Assuming complete reduction) | 5.5 | 6.9 | 6.5 |
| Catalyst Reduction Current (Assuming only $Fe^{3+}$ reductive dissolution) | 1.5 | 1.2 | 0.4 |

As shown in Table 4, acetate is formed when −0.4 V potential bias was applied alone without any illumination. However, the yield was significantly less than the case with bias and illumination together. Bias dependent experiments also show that the amount of acetate formed under illumination decreases as the bias is increased from −0.4 to −0.2 V relative to the Ag/AgCl reference, and no acetate was detected for experiments performed at potentials more positive than −0.2 V. Dark electrolysis was also performed at much lower potentials to test this catalyst for purely electrochemical $CO_2$ reduction activity. Product detection using ion chromatography showed that the Faradaic efficiency for acetate formation decreases at these lower potentials. Headspace analysis showed that $H_2$ evolution increases at these lower potentials and that the catalyst produces almost exclusively $H_2$ at −1.8 V vs. Ag/AgCl with a stable current density of 3.5 mA/cm². No other products were detected in these experiments

TABLE 4

Amount of acetate formed under various conditions on the Fe—Cu oxide (Fe:Cu = 1.3) catalysts as measured by ion chromatography and the corresponding Faradaic efficiencies. All experiments were performed in $CO_2$-saturated, 0.1M sodium bicarbonate electrolyte.

| Illumination[1] | Bias (V)[2] | [Acetate] (µM)[3] | Faradaic Efficiency[3] |
|---|---|---|---|
| Comparison of Dark and Light Electrolysis | | | |
| On | −0.4 | 142 ± 15 | 80 ± 8% |
| Off | −0.4 | 91 ± 14 | 66 ± 10% |
| Photo-Electrolysis Bias Dependence | | | |
| On | −0.3 | 120 ± 5 | 53 ± 2% |
| On | −0.2 | 66 ± 5 | 26 ± 2% |
| Dark Electrolysis Bias Dependence | | | |
| Off | −1.0 | 190 ± 16 | 9 ± 2% |
| Off | −1.8 | 39 ± 5 | 0.9 ± 0.5% |

[1] 100 mW/cm², 400-800 nm (see FIG. S2)
[2] Working electrode bias relative to the Ag/AgCl reference electrode.
[3] Uncertainty values represent the standard error obtained by linear regression of ion chromatography data Depth profiling XPS, electron diffraction, and spatially resolved EDX analysis show that the selective catalyst is a mixed phase material consisting primarily of $CuFeO_2$ with a thin layer of CuO in the near-surface region. XPS shows that following annealing of the as-prepared catalyst the surface Cu is primarily in the +2 oxidation state. However, XPS depth profiling experiments reveal that only a thin layer of CuO is present on the catalyst and that beneath this thin layer, Cu is actually in the +1 oxidation state through the catalyst bulk. As a control experiment, XPS depth profiling was also performed on a CuO electrode to exclude the possibility of Cu' reduction by Ar ions under etching condition. Unlike Cu, which shows a change in oxidation state from surface to bulk, Fe exists primarily in the +3 oxidation state throughout the entire catalyst. A mixture of Fe' and $Cu^+$ is consistent with a $CuFeO_2$ delafossite phase.

Analysis of electron diffraction shows that all peaks observed in these diffraction patterns can be assigned to either $CuFeO_2$ or CuO. This result is consistent with oxidation state data obtained by XPS depth profiling indicating that the selective catalyst is primarily $CuFeO_2$ with a small amount of CuO in the near-surface region. Electron diffraction further shows that as the Cu concentration is increased in the catalyst, the peaks assigned to $CuFeO_2$ decrease in intensity relative to the peaks assigned to CuO, as would be expected for a mixed phase catalyst.

Figure 12A:
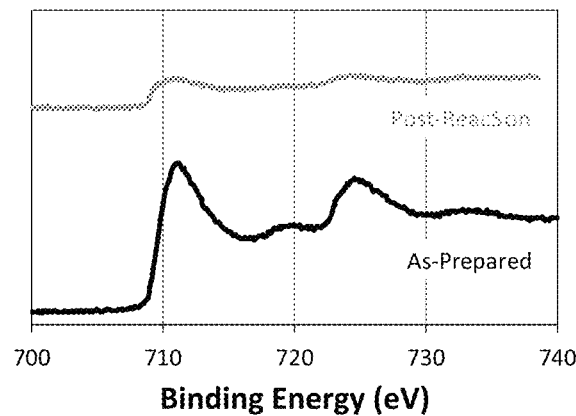
FIGS. 12A-12B are XPS spectra of Fe (FIG. 12A) and Cu (FIG. 12B) 2p lines in the Fe—Cu oxide catalyst (bulk Fe:Cu=1.3) before and after photo-electrochemical reaction showing that Fe is selectively etched from the electrode surface during photo-electrolysis.
Figure 12B:
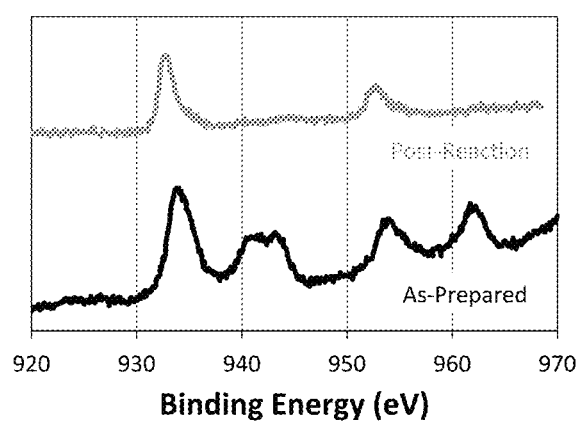
Figure 12C:
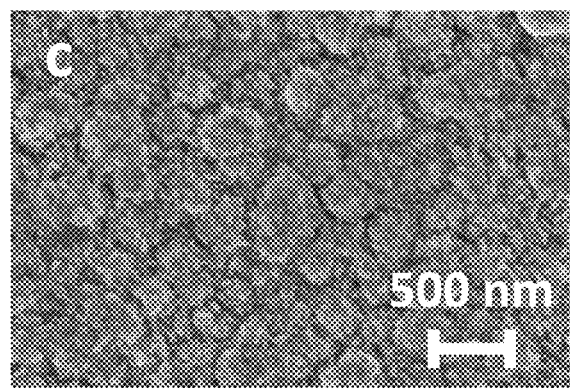
FIGS. 12C-12D are SEM images before (FIG. 12C) and after (FIG. 12D) photo-electrochemical reaction showing the effect of $Fe^{3+}$ reductive dissolution on catalyst morphology.
Figure 12D:
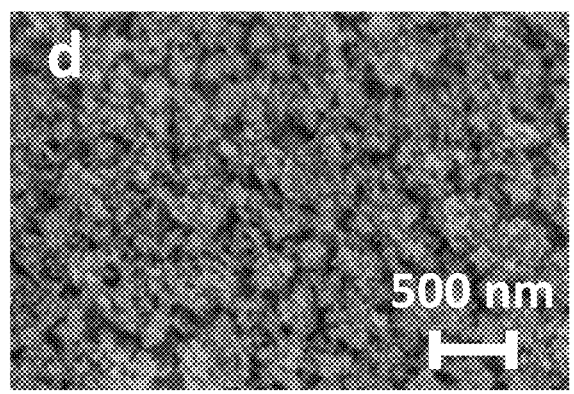

FIGS. 12A-12B show XPS spectra of the Fe and Cu 2p lines for the most selective catalyst (bulk Fe:Cu=1.3) before and after reaction. Notably, this catalyst, which initially has a bulk Fe:Cu atomic fraction of 1.3 as measured by XPS, shows almost no surface Fe following reaction, and the Cu is reduced. ICP-MS analysis of the post-reaction electrolyte confirmed that the loss of Fe from the catalyst surface is the result of dissolution during photo-electrochemical reaction. Additionally, FIGS. 12C-12D show a comparison of SEM images of the catalyst before and after photo-electrochemical reaction, confirming that the catalyst has been partially etched under reaction conditions. Reductive dissolution of photo-excited Fe' has been observed previously for $Fe_2O_3$ in reducing environments. Due to this loss of Fe during photo-electrochemical reaction, the selective catalyst is not stable, and kinetic studies reveal that acetate formation quickly deactivates during the first 10 minutes of reaction. Attempts have been made to prepare thicker catalysts in order to improve electrochemical stability. However, thicker films do not show an increase in stability for acetate production. This may be because reductive dissolution of Fe' occurs from the catalyst surface regardless of thickness, and when the surface of the catalyst becomes Fe deficient, it is no longer active for $CO_2$ reduction to acetate.

CONCLUSION

In summary, the ability to reduce $CO_2$ to acetate with high Faradaic efficiency using a $CuFeO_2$/CuO mixed oxide photo-electrocatalyst has been demonstrated. These results add Fe—Cu oxide to the relatively short list of materials that are capable of efficient C—C bond coupling during $CO_2$ reduction, and the ability to perform photo-electrochemical $CO_2$ reduction to acetate on such a low-cost, earth-abundant catalyst points to new opportunities for energy conversion and chemical synthesis from $CO_2$.

Example 2

Electrocatalytic $CO_2$ Reduction to Acetate Using a $Fe_2O_3$/$(Ni,Fe)_3O_4$ Catalyst Herein, the conversion of $CO_2$ to acetate using a mixed phase $Fe_2O_3$/$(Ni,Fe)_3O_4$ catalyst is demonstrated.

Materials and Methods

Unless otherwise specified all chemicals were purchased from Sigma Aldrich and used without further purification. FTO glass was purchased from Sigma Aldrich (10 Ω/sq). Ag/AgCl aqueous reference electrode was purchased from BASi. Carbon dioxide ($CO_2$) (99.9%) and argon (99.998%) were purchased from Praxair. Electrolyte solutions were prepared with milli-Q water system (Synergy® UV Remote Water Purification System).

Electrode Fabrication

All of the catalysts were prepared by the electrodeposition technique in a single compartment electrochemical cell using an Ag/AgCl aqueous reference electrode with a counter electrode prepared by sputter coating 20 nm of titanium on a glass slide, followed by 100 nm of platinum. Fluorine-doped tin oxide (FTO) coated glass substrates were cut into 1.9 cm×1.9 cm square pieces for use as working electrodes. During electrodeposition the temperature was controlled using an oil bath on a hotplate with a thermometer. The FTO glass was cleaned with piranha solution (3 parts sulphuric acid to 1 part hydrogen peroxide) at 90° C. for 10 minutes. After piranha cleaning, the substrates were rinsed and sonicated for 10 minutes in Milli-Q water before being blown dry with nitrogen for electrodeposition. Controlled potentials were applied using a Biologic® SP-50 potentiostat.

Fe—Ni Mixed Oxide Electrode

The mixed Fe—Ni electrodes were prepared by cathodic deposition on FTO substrates using a 1 mM $Ni(NO_3)_2 \cdot 6H_2O$, 3 mM $Fe(ClO_4)_3$, and 100 mM $KClO_4$ plating solution in DMSO. The deposition was performed at 75° C. with an applied potential of −0.5 V vs. Ag/AgCl. These samples were annealed in air at 650° C. for 3 h.

Results and Discussion

Figure 13:
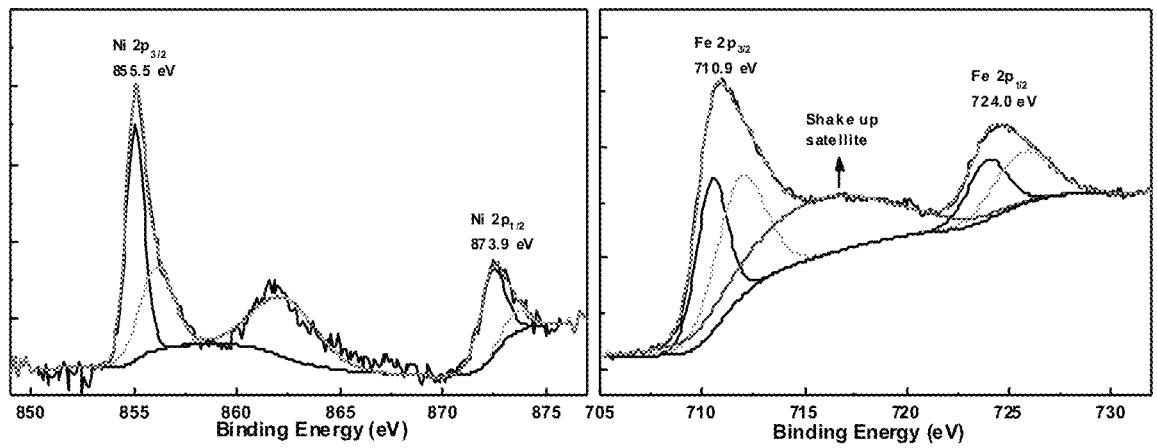
FIG. 13 shows the XPS peak fitting of the Fe 2p and Ni 2p states in the as-prepared $Fe_2O_3/(Ni,Fe)_3O_4$ catalyst.
Figure 14:
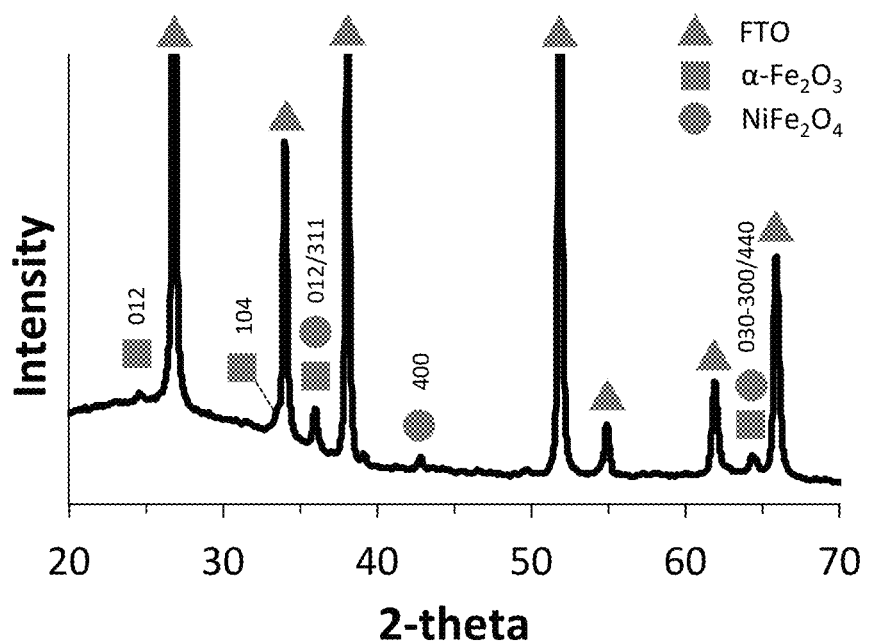
FIG. 14 shows the x-ray diffraction (XRD) pattern of the $Fe_2O_3/(Ni,Fe)_3O_4$ catalyst. Peaks are labeled as originating from the tin oxide substrate, an α-$Fe_2O_3$ catalyst phase, and a $NiFe_2O_4$ catalyst phase.
Figure 15:
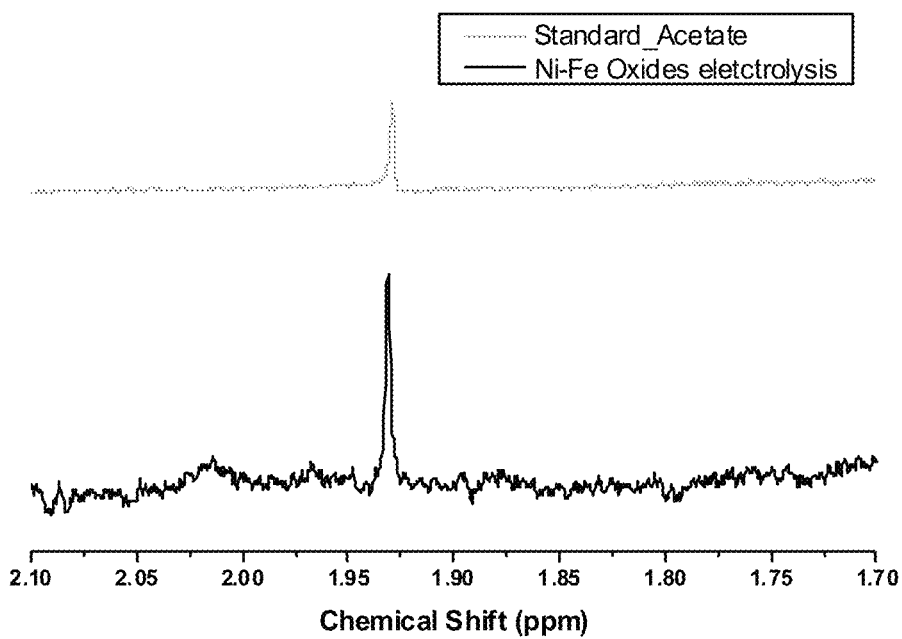
FIG. 15 is an $^1$H NMR spectrum showing acetate produced from a $Fe_2O_3/(Ni,Fe)_3O_4$ catalyst following 2 h electrolysis at –0.55 V vs. Ag/AgCl using flow rates of 13 sccm $CO_2$ and 360 sccm $O_2$.

The bulk Fe:Ni atomic ratio of the $Fe_2O_3$/$(Ni,Fe)_3O_4$ catalyst was measured by ICP-MS as described above. The bulk Fe:Ni atomic ratio of the $Fe_2O_3$/$(Ni,Fe)_3O_4$ catalyst was between 7 and 11. The Fe:Ni atomic ratio in the $Fe_2O_3$/$(Ni,Fe)_3O_4$ catalyst was also measured by fitting XPS spectra (the Fe 2p and Ni 2p states), as shown in FIG. 13. As discussed above, XPS is surface sensitive and allows for quantification of the Fe:Ni atomic ratio at the catalyst surface (as compared to ICP-MS, which measures the Fe:Ni atomic ratio in the bulk). The surface Fe:Ni atomic ratio of the $Fe_2O_3$/$(Ni,Fe)_3O_4$ catalyst, as measured by XPS, was determined to be 4.7. If desired, Fe-Ni catalysts with even higher surface Fe:Ni atomic ratios (e.g., as high as 10) can be prepared. As shown in FIG. 14, the XRD pattern of the $Fe_2O_3$/$(Ni,Fe)_3O_4$ was consistent with a mixed phase material comprising an $\alpha$-$Fe_2O_3$ phase and a $NiFe_2O_4$ phase.

The $Fe_2O_3$/$(Ni,Fe)_3O_4$ catalyst displayed no photocurrent, meaning that illumination had a limited impact on activity of the catalyst. Consequently, $CO_2$ reduction was performed in the absence of illumination. At −0.55 V vs. Ag/AgCl in a 0.1 M bicarbonate electrolyte, the catalyst produced acetate from $CO_2$. The acetate yield from the $Fe_2O_3$/$(Ni,Fe)_3O_4$ catalyst was similar to the $CuO/CuFeO_2$ catalysts described in Example 1, although the Faradaic efficiency was slightly lower. However, no attempt has yet been made to optimize the Ni:Fe ratio in this material.

Similar to the $CuO/CuFeO_2$ catalyst, introduction of an electron scavenger (e.g., $O_2$) can improve catalyst stability.

Example 3

Improving the Long-Term Stability of a $CO_2$ Reduction Electrocatalysts by Introducing an Electron Scavenger Introduction of an electron scavenger, such as $O_2$, dramatically improves the stability of mixed phase metal oxide electrocatalysts during the conversion of carbon dioxide to acetate. In the absence of an electron scavenger (e.g., dissolved $O_2$), the mixed phase metal oxide electrocatalysts will convert $CO_2$ to acetate but will also deactivate within minutes during reaction. By purging the electrolyte solution simultaneously with $O_2$ and $CO_2$, it is possible to efficiently convert $CO_2$ into acetate, with over 40% faradaic efficiency with no sign of deactivation for at least 8 hours of reaction. Much longer stabilization is likely possible with further optimization. These specific studies were performed at −0.35 V vs. Ag/AgCl without illumination. This result has been demonstrated for both the Fe—Cu catalysts described in Example 1 as well as the Fe-Ni catalysts described in Example 2, indicating that a stabilizing stream of an electron scavenger (e.g., $O_2$) can potentially be used to stabilize a wide range of metal oxide electrochemical and/or photo-electrochemical catalysts when conducting reactions (e.g., reducing reactions, such as $CO_2$ reduction).

The limited stability of metal oxide catalysts during reducing reactions has long been a difficult problem. By incorporating an electron scavenger, catalyst stability for electrochemical reduction (e.g., electrochemical reduction of $CO_2$) can be dramatically improved while maintaining reaction selectivity. With this simple modification of co-purging the reaction electrolyte with feedstock (e.g., $CO_2$) and an electron scavenger (e.g., $O_2$), low price, earth abundant materials can serve as efficient catalysts for a range of energy conversion reactions. Other electron scavengers can exhibit similar (or perhaps even better performance) for stabilizing metal oxide catalysts without negatively impacting reaction selectivity. Examples of alternative electron acceptors include, for example, triiodide, quinone, ferric ions, hydrogen peroxide, permanganate, nitrate, and methyl viologen.

Figure 16:
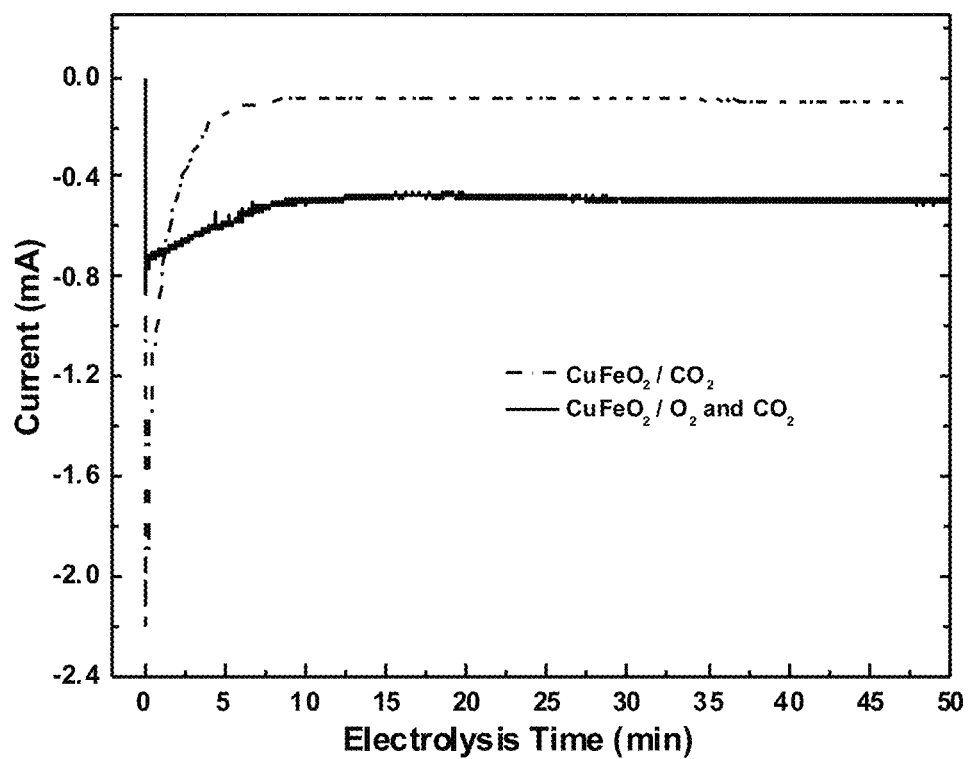
FIG. 16 is a plot of the current profile during electrolysis using a CuO/$CuFeO_2$ electrocatalyst at –0.35 V vs. Ag/AgCl with (black trace) and without (dashed trace) an electron scavenger. In both cases, the reactions were performed without illumination in 0.1 M bicarbonate electrolyte.

FIG. 16 is a plot of the current profile during electrolysis using a $CuO/CuFeO_2$ electrocatalyst at −0.35 V vs. Ag/AgCl without illumination in 0.1 M bicarbonate electrolyte. The dashed trace shows the very fast decay of reductive current within approximately 5 min during reaction in the absence of an electron scavenger. However, upon introduction of an electron scavenger (e.g., $O_2$) along with the $CO_2$ feedstock (black trace), the reductive current is stabilized for greater than 50 minutes.

Figure 17:
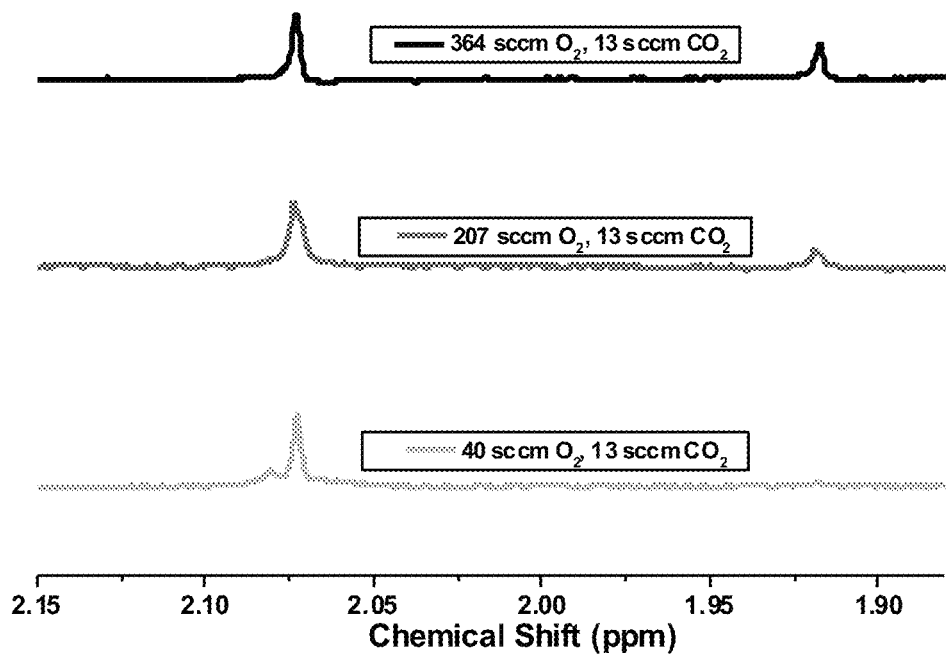
FIG. 17 includes $^1$H NMR spectra showing acetate production relative to an acetonitrile internal standard obtained following 4 hours electrolysis using a CuO/$CuFeO_2$ electrocatalyst at –0.35 V vs. Ag/AgCl without illumination in 0.1 M bicarbonate electrolyte in the presence of an electron scavenger ($O_2$).

FIG. 17 includes $^1$H NMR spectra showing acetate production relative to an acetonitrile internal standard obtained following 4 hours electrolysis using a $CuO/CuFeO_2$ electrocatalyst at −0.35 V vs. Ag/AgCl without illumination in 0.1 M bicarbonate electrolyte in the presence of an electron scavenger ($O_2$). Peaks at approximately 2.07 ppm correspond to acetonitrile used as an internal standard, while peaks at approximately 1.92 ppm correspond to acetate produced from $CO_2$ reduction. Each spectrum shows the result for a different flow rate of $O_2$ ranging from 40 to 364 sccm with a fixed 13 sccm $CO_2$ flow rate. As show in FIG. 17, selectivity for acetate production increases with increasing $O_2$ flow rates.

Figure 18:
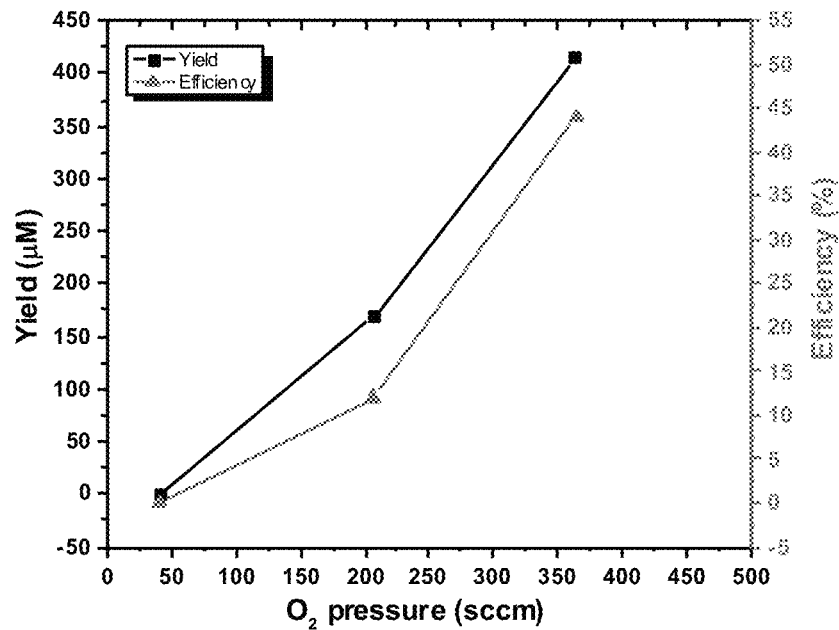
FIG. 18 is a plot showing the yield of acetate (black trace) and the corresponding Faradaic efficiency (gray trace) as a function of $O_2$ flow rate obtained during electrolysis with a constant $CO_2$ flow rate of 13 sccm.

FIG. 18 is a plot showing the yield of acetate (black trace) and the corresponding Faradaic efficiency (gray trace) as a function of $O_2$ flow rate obtained during electrolysis with a constant $CO_2$ flow rate of 13 sccm. The results show increasing Faradaic efficiency with increasing $O_2$ flow rates.

Figure 19:
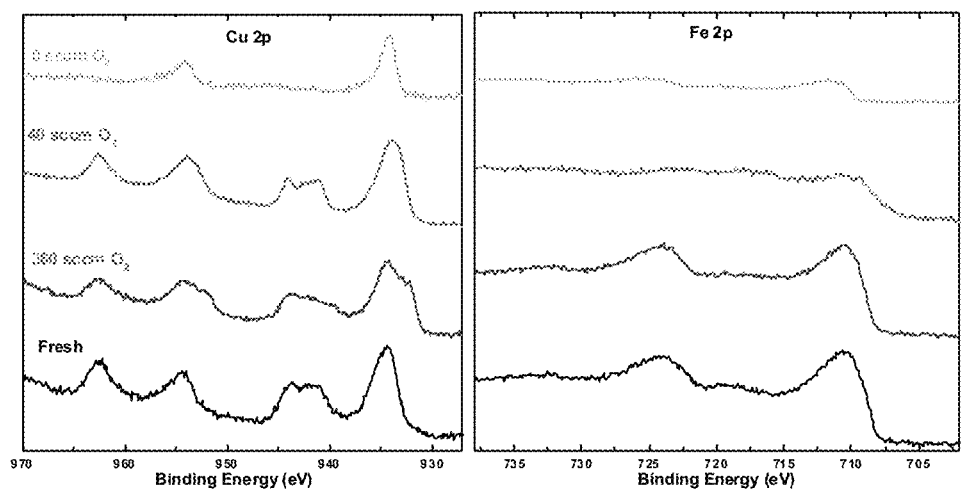
FIG. 19 shows Cu 2p and Fe 2p XPS spectra of a CuO/$CuFeO_2$ electrocatalyst as-prepared (black) and following 4 h electrolysis with various $O_2$ flow rates and a fixed $CO_2$ flow rate of 13 sccm.

FIG. 19 shows the Cu 2p and Fe 2p XPS spectra of a $CuO/CuFeO_2$ electrocatalyst as-prepared (black) and following 4 h electrolysis with various $O_2$ flow rates and a fixed $CO_2$ flow rate of 13 sccm. As shown in FIG. 19, Fe leaches from the catalyst surface during reaction when the $O_2$ flow rate is low, but does not leach from the catalyst surface when the $O_2$ flow rate is sufficiently high. This suggests that the electron scavenger (e.g., $O_2$) serves at least in part to stabilize the Fe in the catalyst surface against reductive dissolution. Comparison of this plot with FIG. 18 indicates that increased stability of the surface Fe in the catalyst corresponds to increased Faradaic efficiency for acetate production from $CO_2$.

Figure 20A:
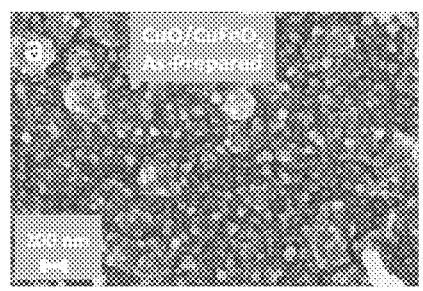
FIGS. 20A-20C are SEM images of CuO/$CuFeO_2$ catalysts as-prepared (FIG. 20A) and following 4 h electrolysis with 13 sccm $CO_2$ (FIG. 20B) and 13 sccm $CO_2$ and 360 sccm $O_2$ (FIG. 20C).
Figure 20B:
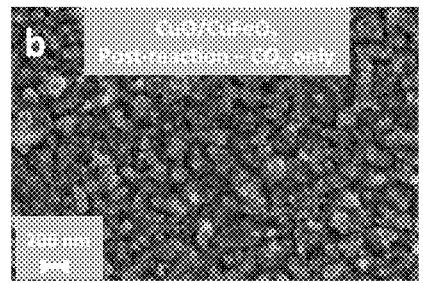
Figure 20C:
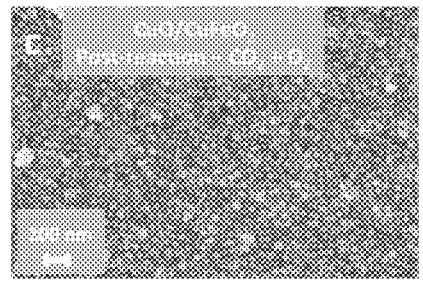
Figure 21:
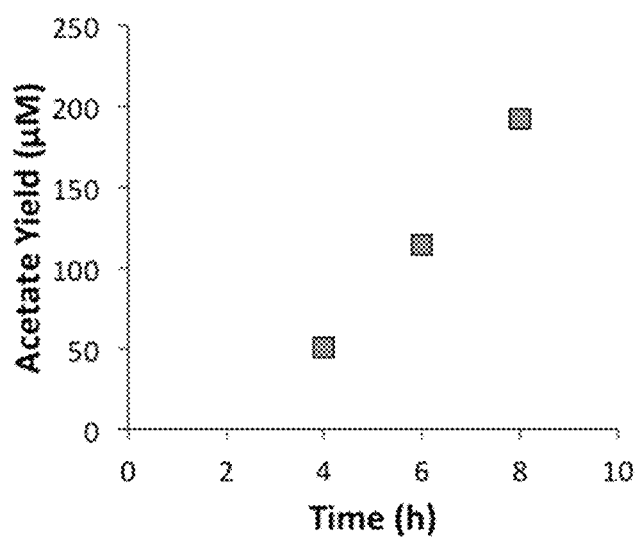
FIG. 21 is a plot showing stable acetate production for 8 h during $CO_2$ reduction using a CuO/$CuFeO_2$ electrocatalyst at –0.35 V vs. Ag/AgC$_1$ with an electron scavenger ($O_2$) in 0.1 M bicarbonate electrolyte without illumination.

FIGS. 20A-20C are SEM images of $CuO/CuFeO_2$ catalysts as-prepared (FIG. 20A) and following 4 h electrolysis with 13 sccm $CO_2$ (FIG. 20B) and 13 sccm $CO_2$ and 360 sccm $O_2$ (FIG. 20C). Results show that in the absence of $O_2$, the catalyst is etched under reaction conditions, but etching is minimized by the presence of $O_2$.

FIG. 20C is a plot showing stable acetate production for 8 h during $CO_2$ reduction at −0.35 V vs. Ag/AgCl in 0.1 M bicarbonate electrolyte without illumination. This long-term stability is only possible due to the role of $O_2$ to serve as an electron acceptor resulting in greatly enhanced catalyst stability.

The compositions, devices, systems, and methods of the appended claims are not limited in scope by the specific compositions, devices, systems, and methods described herein, which are intended as illustrations of a few aspects of the claims. Any compositions, devices, systems, and methods that are functionally equivalent are intended to fall within the scope of the claims. Various modifications of the compositions, devices, systems, and methods in addition to those shown and described herein are intended to fall within the scope of the appended claims. Further, while only certain representative compositions, devices, systems, and method steps disclosed herein are specifically described, other combinations of the compositions, devices, systems, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A mixed-phase electrocatalyst comprising a first metal oxide phase and a second metal oxide phase,
   wherein the first metal oxide phase comprises a metal oxide defined by Formula I or Formula II below MO             Formula I $Fe_2O_3$            Formula II and the second metal oxide phase comprises a metal oxide defined by Formula III or Formula IV below $MFeO_2$           Formula III $(M,Fe)_3O_4$          Formula IV where M is chosen from Cu and Ni; and
   wherein the mixed-phase electrocatalyst has a surface Fe:M atomic ratio of from 0.75:1 to 7:1, as measured by x-ray photoelectron spectroscopy (XPS).

2. The electrocatalyst of claim 1, wherein first metal oxide phase comprises $Fe_2O_3$ and the second metal oxide phase comprises $NiFe_2O_4$.

3. The electrocatalyst of claim 1, wherein first metal oxide phase comprises CuO and the second metal oxide phase comprises $CuFeO_2$.

4. The electrocatalyst of claim 1, wherein the surface Fe:M atomic ratio is from 0.75:1 to 5:1.

5. The electrocatalyst of claim 4, wherein the surface Fe:M atomic ratio is from 0.75:1 to 2:1.

6. The electrocatalyst of claim 5, wherein the surface Fe:Cu atomic ratio is from 1:1 to 1.5:1.

7. The electrocatalyst of claim 1, wherein the electrocatalyst has a bulk Fe:M atomic ratio, as measured by inductively coupled plasma mass spectrometry (ICP-MS), and wherein the surface Fe:M atomic ratio is greater than or equal to the bulk Fe:M atomic ratio.

8. The electrocatalyst of claim 7, wherein the bulk Fe:Cu atomic ratio is from 0.4:1 to 10:1.

9. The electrocatalyst of claim 8, wherein the bulk Fe:Cu atomic ratio is from 0.4:1 to 2:1.

10. The electrocatalyst of claim 9, wherein the bulk Fe:Cu atomic ratio is from 0.8 to 1.5.

11. An electrode comprising a conductive substrate and an electrocatalytic thin film disposed on the conductive substrate, wherein the electrocatalytic thin film is formed from aggregated nanoparticles comprising the mixed-phase electrocatalyst of claim 1.

12. A method of electrochemically reducing carbon dioxide to provide a product, the method comprising:
   contacting the carbon dioxide with the mixed-phase electrocatalyst of claim 1 in an electrochemical cell; and
   applying a potential to the electrochemical cell to form the product, wherein the product comprises acetate, formate, or a combination thereof.

13. The method of claim 12, wherein the acetate, the formate, or the combination thereof is formed at a Faradaic efficiency of from 15% to 95%.

14. The method of claim 12, wherein the method is selective for the formation of acetate over formate, such that the acetate is formed with at least two times greater Faradaic efficiency than the formate.

15. The method of claim 12, wherein the method further comprises contacting the mixed-phase electrocatalyst with an electron scavenger.

16. The method of claim 15, wherein the electron scavenger comprises $O_2$.

17. The method of claim 12, wherein the method further comprises impinging the electrocatalyst with electromagnetic radiation.

18. The method of claim 12, wherein the applied potential is from −0.1 V to −1.8 V vs. an Ag/AgCl reference electrode.

19. A mixed-phase electrocatalyst comprising a cupric oxide phase and a delafossite phase, wherein the mixed-phase electrocatalyst has a surface Fe:Cu atomic ratio of from 0.75:1 to 5:1, as measured by x-ray photoelectron spectroscopy (XPS).

* * * * *